(12) United States Patent
Matsunaga

(10) Patent No.: US 9,167,545 B2
(45) Date of Patent: Oct. 20, 2015

(54) RECEIVER, METHOD OF CALCULATING TIME DIFFERENCE, AND PROGRAM

(71) Applicant: Sony Corporation, Tokyo (JP)

(72) Inventor: Osamu Matsunaga, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/286,027

(22) Filed: May 23, 2014

(65) Prior Publication Data

US 2014/0362960 A1    Dec. 11, 2014

(30) Foreign Application Priority Data

Jun. 10, 2013  (JP) ................................. 2013-121589

(51) Int. Cl.
*H04W 56/00*    (2009.01)

(52) U.S. Cl.
CPC .................................. *H04W 56/004* (2013.01)

(58) Field of Classification Search
CPC ........... H04B 17/00; H04B 17/01; H04J 3/06; H04J 3/24; H04L 7/00; H04L 7/02; H04L 12/26; H04L 12/56; H04L 29/06; H04W 24/04; H04W 56/00; H04W 56/005
USPC .......... 370/252, 329, 349, 350, 503; 375/224, 375/260, 354, 358; 455/67.16, 502; 709/202, 208, 248; 713/400
See application file for complete search history.

(56) References Cited

U.S. PATENT DOCUMENTS

| | | | |
|---|---|---|---|
| 6,681,099 B1 * | 1/2004 | Keranen et al. | 455/67.16 |
| 7,668,151 B2 * | 2/2010 | Ryu et al. | 370/350 |
| 8,135,866 B2 * | 3/2012 | Shatsky et al. | 709/248 |
| 8,553,824 B2 * | 10/2013 | Dai et al. | 375/354 |
| 8,737,379 B2 * | 5/2014 | Gresset et al. | 370/350 |
| 8,806,063 B1 * | 8/2014 | Kamath et al. | 709/248 |
| 2004/0005902 A1 * | 1/2004 | Belcea | 455/502 |
| 2005/0041692 A1 * | 2/2005 | Kallstenius | 370/503 |
| 2005/0169233 A1 * | 8/2005 | Kandala et al. | 370/349 |
| 2009/0086764 A1 * | 4/2009 | Lee et al. | 370/503 |
| 2009/0141699 A1 * | 6/2009 | Goshen et al. | 370/350 |
| 2010/0161723 A1 * | 6/2010 | Bryce et al. | 709/203 |
| 2010/0250781 A1 * | 9/2010 | Matsunaga | 709/248 |
| 2011/0051754 A1 * | 3/2011 | Lansdowne | 370/503 |
| 2011/0150005 A1 * | 6/2011 | Chen et al. | 370/503 |
| 2011/0176534 A1 * | 7/2011 | Subramanian et al. | 370/350 |
| 2012/0263220 A1 * | 10/2012 | Li et al. | 375/224 |

FOREIGN PATENT DOCUMENTS

JP    2010-232845    10/2010

* cited by examiner

*Primary Examiner* — Sam K Ahn
*Assistant Examiner* — Shawkat M Ali
(74) *Attorney, Agent, or Firm* — K&L Gates LLP

(57) ABSTRACT

There is provided a receiver including a first delay time calculating unit configured to calculate a first delay time indicating a time lag between transmission of a transmission signal by a transmitter and reception of the transmission signal by the receiver, a second delay time calculating unit configured to calculate a second delay time indicating a time lag between transmission of a response signal by the receiver and reception of the response signal by the transmitter, and a time difference calculating unit configured to calculate a time difference between a time of a clock in the transmitter and a time of a clock in the receiver.

6 Claims, 15 Drawing Sheets

RECEIVER, METHOD OF CALCULATING TIME DIFFERENCE, AND PROGRAM

CROSS REFERENCES TO RELATED APPLICATIONS

The present application claims priority to Japanese Priority Patent Application JP 2013-121589 filed in the Japan Patent Office on Jun. 10, 2013, the entire content of which is hereby incorporated by reference.

BACKGROUND

The present disclosure relates to a receiver, a method of calculating time difference, and a program.

A mode based on the IEEE 1588 Precision Time Protocol (PTP) standard may be exemplified as a method of correcting the time of a clock in a receiver using communication between the receiver and a transmitter. In addition, a technique disclosed in JP 2010-232845A is exemplified as a technology for correcting the time of a clock in a receiver using synchronous packets.

SUMMARY

When a communication mode based on IEEE1588 PTP standard is employed, it is necessary that a time lag between transmission of a transmission signal by a transmitter and reception of the transmission signal by a receiver (hereinafter sometimes referred to as "forward-path delay time") is equal to a time lag between transmission of a response signal by the receiver and reception of the response signal by the transmitter (hereinafter sometime referred to as "return-path delay time"), or the average value of forward-path delay time is equal to that of return-path delay time. However, in an actual network in which communication between a receiver and a transmitter is performed, the forward-path delay time is less likely to be equal to the return-path delay time or the average value of a forward-path delay time is less likely to be equal to the average value of a return-path delay time. Thus, even when a communication mode based on the IEEE1588 PTP standard is employed, it is not necessarily that the time of a clock in a receiver can be corrected more accurately.

Furthermore, in the technique, for example, disclosed in JP 2010-232845A, the receiver estimates the forward-path delay time by performing cumulative operation on the difference between reception and transmission time differences of temporally adjacent synchronization control packets. Thus, when the technique, for example, disclosed in JP 2010-232845A is employed, it is possible to estimate a delay time in the communication between the receiver and the transmitter by using only the forward-path delay time. However, when the technique, for example, disclosed in JP 2010-232845A is employed, it is necessary to provide a minimum value of the delay time to the receiver in advance as a condition for estimating the delay time. Thus, even when the technique, for example, disclosed in JP 2010-232845A is employed, it is not necessarily that the time of a clock in a receiver can be corrected more accurately by using a minimum value of the delay time prepared in advance.

Embodiments of the present disclosure provide a novel and improved receiver, method of calculating time difference, and program, capable of calculating time difference between the time of a clock in a transmitter and the time of a clock in the receiver.

According to an embodiment of the present disclosure, there is provided a receiver including a first delay time calculating unit configured to calculate a first delay time indicating a time lag between transmission of a transmission signal by a transmitter and reception of the transmission signal by the receiver based on first time information indicating a time at which the transmitter transmits the transmission signal and second time information indicating a time at which the receiver receives the transmission signal, a second delay time calculating unit configured to calculate a second delay time indicating a time lag between transmission of a response signal by the receiver and reception of the response signal by the transmitter based on third time information indicating a time at which the receiver transmits the response signal corresponding to the transmission signal and fourth time information indicating a time at which the transmitter receives the response signal, and a time difference calculating unit configured to calculate a time difference between a time of a clock in the transmitter and a time of a clock in the receiver based on the calculated first delay time and the calculated second delay time. The time difference calculating unit calculates a fixed delay component in the first delay time and the second delay time as the time lag using a logical operation without using a filter.

According to an embodiment of the present disclosure, there is provided a method of calculating time difference, the method including calculating a first delay time indicating a time lag between transmission of a transmission signal by a transmitter and reception of the transmission signal by a receiver based on first time information indicating a time at which the transmitter transmits the transmission signal and second time information indicating a time at which the receiver receives the transmission signal, calculating a second delay time indicating a time lag between transmission of a response signal by the receiver and reception of the response signal by the transmitter based on third time information indicating a time at which the receiver transmits the response signal corresponding to the transmission signal and fourth time information indicating a time at which the transmitter receives the response signal, and calculating a time difference between a time of a clock in the transmitter and a time of a clock in the receiver based on the calculated first delay time and the calculated second delay time. In the step of calculating the time difference, a fixed delay component in the first delay time and the second delay time is calculated as the time lag using a logical operation without using a filter.

According to an embodiment of the present disclosure, there is provided a program for causing a computer to execute calculating a first delay time indicating a time lag between transmission of a transmission signal by a transmitter and reception of the transmission signal by a receiver based on first time information indicating a time at which the transmitter transmits the transmission signal and second time information indicating a time at which the receiver receives the transmission signal, calculating a second delay time indicating a time lag between transmission of a response signal by the receiver and reception of the response signal by the transmitter based on third time information indicating a time at which the receiver transmits the response signal corresponding to the transmission signal and fourth time information indicating a time at which the transmitter receives the response signal, and calculating a time difference between a time of a clock in the transmitter and a time of a clock in the receiver based on the calculated first delay time and the calculated second delay time. In the step of calculating the time difference, a fixed delay component in the first delay time and the second delay time is calculated as the time lag using a logical operation without using a filter.

According to one or more embodiments of the present disclosure, it is possible to calculate time difference between the time of a clock in a transmitter and the time of a clock in the receiver.

Additional features and advantages are described herein, and will be apparent from the following Detailed Description and the figures.

DETAILED DESCRIPTION

Figure 1:
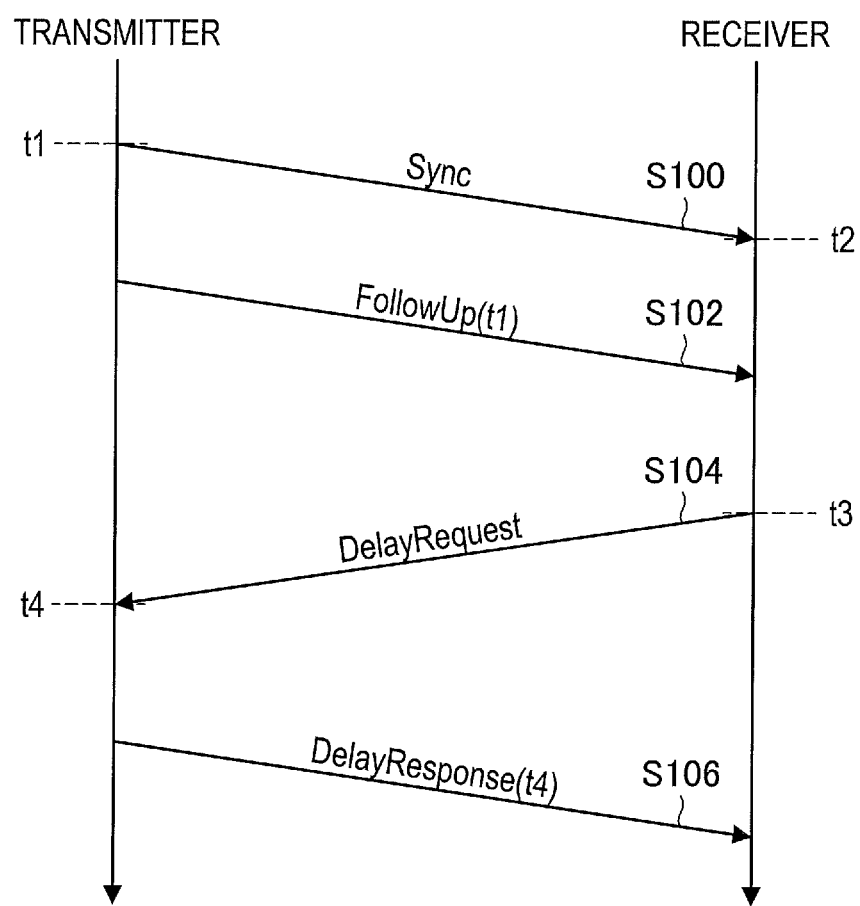
FIG. 1 is a diagram for explaining a mode based on the IEEE1588 PTP standard.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.

1. Method of calculating time difference according to an embodiment of the present disclosure 2. Receiver according to an embodiment of the present disclosure 3. Program according to an embodiment of the present disclosure (Method of Calculating Time Difference According to an Embodiment of the Present Disclosure)

Prior to the description of the configuration of a receiver according to an embodiment of the present disclosure, a method of calculating time difference according to an embodiment of the present disclosure will be described first. In the following, the method of calculating time difference according to an embodiment of the present disclosure will be described by exemplifying a case where a receiver according to an embodiment of the present disclosure carries out a process for the method of calculating time difference according to an embodiment of the present disclosure.

[I] Example of Problem in Case of Using Technique in Related Art

As described above, if the mode based on the IEEE1588 PTP standard or the related art including the technique disclosed in JP 2010-232845A is used, it is not necessarily that the time of a clock in a receiver can be corrected more accurately. Prior to the description of the method of calculating time difference according to an embodiment of the present disclosure, the mode based on the IEEE1588 PTP standard that is one method of correcting the time of a clock in a receiver through an asynchronous network and an example of problems caused by the mode will be described in more detail.

In the IEEE1588 PTP standard, synchronization between the time of a clock in a transmitter and the time of a clock in a receiver is achieved by transmitting and receiving four types of messages between a transmitter and a receiver. These four types of messages are a synchronization message (hereinafter sometimes referred to as a "Sync" message), a follow-up message (hereinafter sometimes referred to as a "FollowUp" message), a delay request message (hereinafter sometimes referred to as a "DelayRequest" message), and a delay response message (hereinafter sometimes referred to as a "DelayResponse" message).

FIG. 1 is a diagram for explaining a mode based on the IEEE1588 PTP standard.

A transmitter sends a Sync message to a receiver to inform the receiver of the initiation of a time synchronization operation (S100).

When the receiver receives the Sync message sent from the transmitter in step S100, the receiver specifies a Sync reception time t2 that is the time of reception of the Sync message measured by a clock in the receiver and uses time information indicating the Sync reception time t2 (corresponding to second time information according to an embodiment of the present disclosure as described later) for processing.

The transmitter also sends a FollowUp message to the receiver after the transmission of the Sync message to inform the receiver of initiation time information of the time synchronization operation (S102). Here, the FollowUp message sent in this step S102 includes, for example, time information indicating a Sync transmission time t1 (corresponding to first time information according to an embodiment of the present disclosure as described later) that is the time of transmission of the Sync message measured by a clock in the transmitter.

When the receiver receives the FollowUp message sent from the transmitter in step S102, the receiver sends a DelayRequest message to the transmitter for requiring the transmitter to send a DelayResponse message (S104). Here, the DelayRequest message corresponds to a response signal according to an embodiment of the present disclosure as described later. In addition, the receiver specifies a DelayRequest transmission time t3 that is the time of transmission of the DelayRequest message measured by a clock in the receiver and uses time information indicating the DelayRequest transmission time t3 (corresponding to third time information according to an embodiment of the present disclosure as described later) for processing.

When the transmitter receives the DelayRequest message sent from the receiver in step S104, the transmitter sends a DelayResponse message to the receiver in response to the received DelayRequest message (S106). Here, the transmitter specifies a DelayRequest reception time t4 that is the time of reception of the DelayRequest message measured by a clock in the transmitter. Then, the transmitter sends the DelayResponse message that includes time information indicating the DelayRequest reception time t4 (corresponding to fourth time information according to an embodiment of the present disclosure as described later) to the receiver.

For example, the transmission and reception of signals as illustrated in FIG. 1 are performed between the receiver and the transmitter, and thus the receiver uses the Sync transmission time t1, the Sync reception time t2, the DelayRequest transmission time t3, and the DelayRequest reception time t4 for processing.

More specifically, when it is assumed that a forward-path delay time is equal to a return-path delay time on a condition that a clock frequency of a clock in a transmitter is coincident with that of a clock in a receiver by using a mechanism (will be described later) for allowing the clock frequencies of clocks of the transmitter and the receiver to be coincident with each other, the following Equations (1) and (2) are satisfied. Here, in Equations (1) and (2), "offset" represents the time difference between a clock in a transmitter and a clock in a receiver.

$$t2-t1 = \text{delay time} + \text{offset} \quad (1)$$

$$t4-t3 = \text{delay Time} - \text{offset} \quad (2)$$

The receiver, when using the mode based on the IEEE1588 PTP standard, calculates time difference between a clock in a transmitter and a clock in a receiver by calculating "offset" represented in Equations (1) and (2) using, for example, the following Equation (3). Then, the receiver, when using the mode based on the IEEE1588 PTP standard, achieves the synchronization between clocks in the transmitter and the receiver by correcting a clock in the receiver using the calculated time difference.

$$\text{offset} = \{(t2-t1)-(t4-t3)\} \times (\tfrac{1}{2}) \quad (3)$$

When the mode based on the IEEE1588 PTP standard is used, an offset, that is, the time difference between clocks in the transmitter and the receiver is determined, for example, using the operation shown in Equation (3). In an actual network in which communication is performed between a transmitter and a receiver, however, a forward-path delay time is less likely to be equal to a return-path delay time, or an average value of the forward-path delay time is less likely to be equal to an average value of the return-path delay time. In other words, even when it is assumed that an average value of the forward-path delay time is equal to that of the return-path delay time, in an actual network in which a transmitter and a receiver communicate with each other, the forward-path delay time and the return-path delay time will vary for each packet.

Thus, even when time difference between clocks in the transmitter and the receiver which is calculated using the mode based on the IEEE1588 PTP standard (hereinafter, such time difference is sometimes referred simply to as "offset") is used, it is not necessarily that the time of a clock in a receiver can be corrected more accurately.

[II] Example of Method for Solving Problems Caused by the Use of Technique in Related Art When the mode based on the IEEE1588 PTP standard is used, a method of reducing the influence caused by a potential change in a forward-path delay time and a return-path delay time for each packet may include an approach for causing a noise reduction filter such as a low-pass filter to work on a calculated offset.

Figure 2:
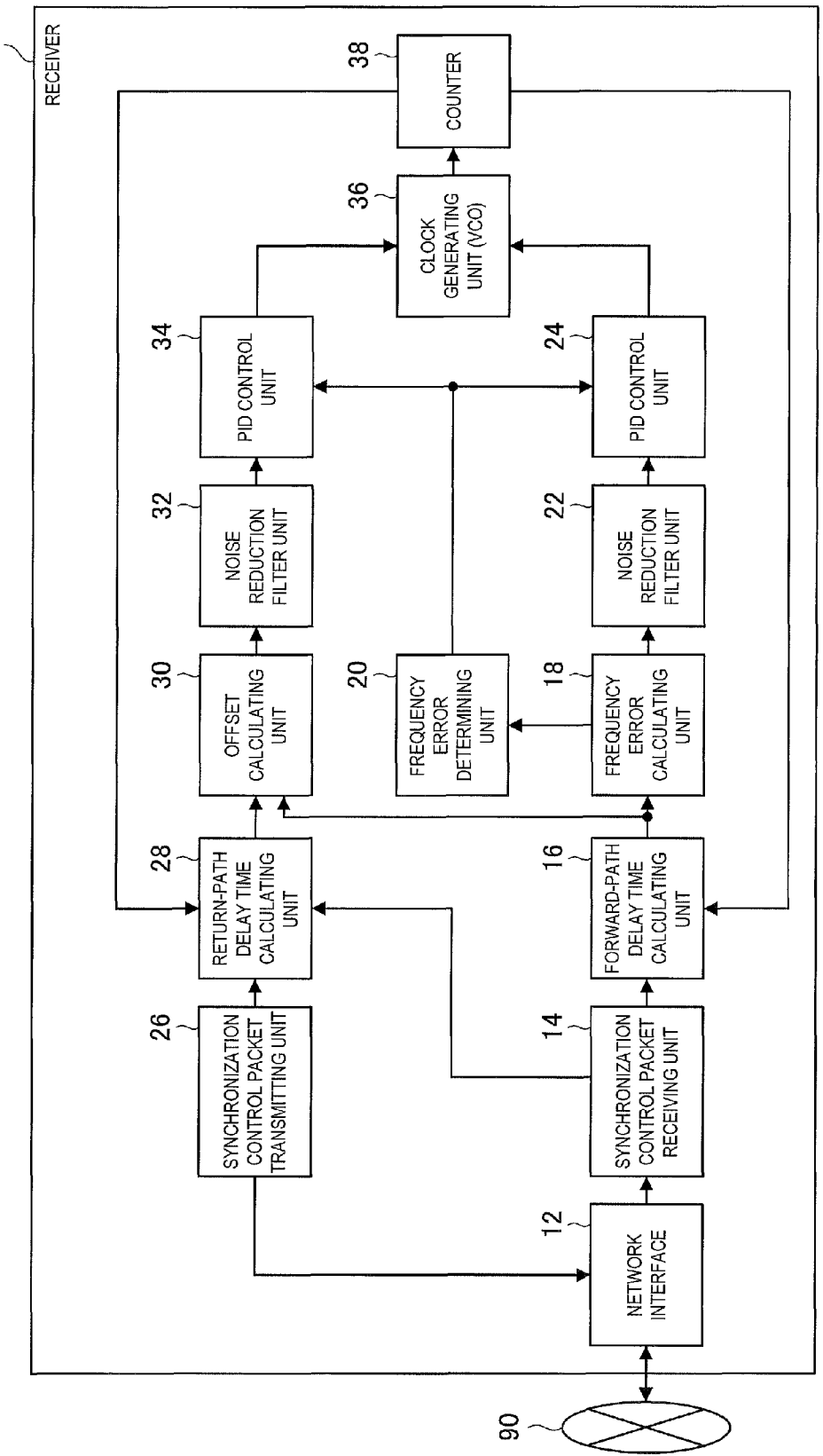
FIG. 2 is a block diagram illustrating an exemplary configuration of a receiver intended for solving potential problems caused when the mode based on the IEEE1588 PTP standard is used.

FIG. 2 is a block diagram illustrating an exemplary configuration of a receiver 10 intended for solving problems that may be caused when the mode based on the IEEE1588 PTP standard is used. In FIG. 2, there is also illustrated a network 90 through which the receiver communicates with a transmitter. Alternatively, the receiver 10 may be configured to perform a direct communication with a transmitter without through the network 90.

Examples of the network 90 include a wired network such as a local area network (LAN) or a wide area network (WAN), a wireless network such as a wireless local area network (Wireless LAN or simply WLAN) or a wireless wide area network (Wireless WAN or simply WWAN) using a base station, and the Internet using a communication protocol such as Transmission Control Protocol/Internet Protocol (TCP/IP).

The receiver 10 is configured to include, for example, a network interface 12, a synchronization control packet receiving unit 14, a forward-path delay time calculating unit 16, a frequency error calculating unit 18, a frequency error determining unit 20, a noise reduction filter unit 22, a PID control unit 24, a synchronization control packet transmitting unit 26, a return-path delay time calculating unit 28, an offset calculating unit 30, a noise reduction filter unit 32, a PID control unit 34, a clock generating unit 36, and a counter 38.

Furthermore, the receiver 10 may be configured to include a controller (not shown) that is configured to include a micro processing unit (MPU) or various types of processing circuits for controlling the entire receiver 10, or include a time information generating unit (not shown) that generates time information. In addition, the receiver 10 may be configured to include a timing signal generating unit (not shown) that generates a timing signal used to synchronize and process various types of signals such as image signals.

The network interface 12 is a communication mechanism that performs communication with a transmitter via the network 90 (or directly without through the network). The receiver 10 receives messages such as Sync, FollowUp, and DelayResponse shown in FIG. 1 via the network interface 12 and sends a DelayRequest message shown in FIG. 1. The DelayRequest message is sent by the synchronization control packet transmitting unit 26. In addition, the synchronization control packet transmitting unit 26 transmits time information, which indicates the time t3 when the DelayRequest message is sent, to the return-path delay time calculating unit 28.

Examples of the network interface 12 include a LAN terminal and transmitting/receiving circuit, a communication antenna and RF circuit, an IEEE802.15.1 port and transmitting/receiving circuit, an IEEE802.11b port and transmitting/receiving circuit, and so on.

The synchronization control packet receiving unit 14 transmits a Sync or FollowUp message received by the network interface 12 to the forward-path delay time calculating unit 16 and transmits a DelayResponse message received by the network interface 12 to the return-path delay time calculating unit 28.

The forward-path delay time calculating unit 16 is configured to include, for example, an adder to perform the operation shown in Equation (1). The forward-path delay time calculating unit 16 transmits an operation result obtained by Equation (1) to the frequency error calculating unit 18 for calculating a frequency error and the offset calculating unit 30 for calculating an offset.

The receiver 10 has a control system in which the operation result obtained by Equation (1) and received by the frequency error calculating unit 18 is transmitted through the noise reduction filter unit 22, the PID control unit 24, the clock generating unit 36, and the counter 38 and is fed back to the forward-path delay time calculating unit 16. Here, the control system corresponds to a mechanism provided in the receiver 10 for allowing clock frequencies of a clock in a transmitter and a clock in the receiver to be coincident with each other.

Here, the noise reduction filter unit 22 is configured to include a noise reduction filter such as a low-pass filter and eliminates noises contained in the frequency error transmitted from the frequency error calculating unit 18. The PID control unit 24 performs the proportional-integral-derivative (PID) control.

The clock generating unit 36 includes a voltage-controlled oscillator (VCO) or the like to generate a clock signal. Here, a clock signal generated by the clock generating unit 36 can be used as a processing clock for processing various types of signals such as image signals.

The counter 38 updates a count value based on a clock signal to be transmitted. The count value of the counter 38 can be used to generate time information in a time information generating unit (not shown) or used to generate a timing signal in a timing signal generating unit (not shown).

The operation result of the frequency error calculating unit 18 is also transmitted to the frequency error determining unit 20, and the frequency error determining unit 20 controls operations of the PID control unit 24 and the PID control unit 34 at the time when it is checked that the operation result falls within a given frequency pull-in range. The frequency error determining unit 20 corresponds to a mechanism for causing the time control to be preceded by the clock frequency control in the receiver 10.

The return-path delay time calculating unit 28 is configured to include, for example, an adder to perform the operation shown in Equation (2). The return-path delay time calculating unit 26 transmits the operation result obtained by Equation (2) to the offset calculating unit 30.

The offset calculating unit 30 calculates an offset based on the operation result obtained by Equation (1) and transmitted from the forward-path delay time calculating unit 16, that is, a forward-path delay time and the operation result obtained by Equation (2) and transmitted from the return-path delay time calculating unit 28, that is, a return-path delay time. The offset calculating unit 30 calculates an offset by performing the operation shown in Equation (3).

Figure 3:
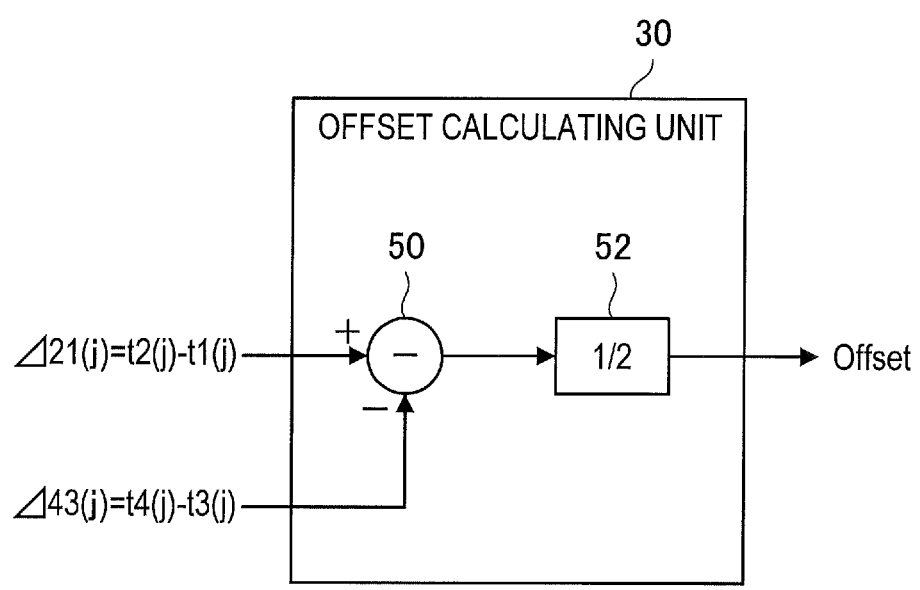
FIG. 3 is a block diagram illustrating an exemplary configuration of an offset calculating unit included in the receiver using the mode based on the IEEE1588 PTP standard.

FIG. 3 is a block diagram illustrating an exemplary configuration of the offset calculating unit 30 included in the receiver 10 using the mode based on the IEEE1588 PTP standard. In FIG. 3, "$\Delta 21(j)$" represents a forward-path delay time for a packet j (where j is positive integer), and "$\Delta 43(j)$" represents a return-path delay time for the packet j. Additionally, in FIG. 3, a calculated offset to be outputted from the offset calculating unit 30 is represented as "Offset".

The offset calculating unit 30 is configured to include an adder 50 and a multiplier 52. The adder 50 calculates a difference value between a forward-path delay time and a return-path delay time. The multiplier 52 multiplies the calculated difference value by ½.

Note that, the configuration of the offset calculating unit 30 is not limited to the above-described configuration. For example, the offset calculating unit 30 may be configured to include a divider that divides a calculated difference value by 2 instead of the multiplier 52.

The offset calculating unit 30 performs the operation shown in Equation (3), for example, by employing the configuration illustrated in FIG. 3.

An exemplary configuration of the receiver 10 will be described with reference back to FIG. 2. The receiver 10 has a control system in which the operation result obtained by Equation (3) in the offset calculating unit 30 is transmitted through the noise reduction filter unit 32, the PID control unit 34, the clock generating unit 36, and the counter 38 and is fed back to the return-path delay time calculating unit 28.

In this control system, the noise reduction filter unit 32 is configured to include a noise reduction filter such as a low-pass filter to eliminate noises contained in the operation result, that is, the offset obtained by Equation (3) and transmitted from the offset calculating unit 30. The PID control unit 34 performs the PID control.

The receiver 10 implements the mode based on the IEEE1588 PTP standard, for example, by employing the configuration illustrated in FIG. 2. In addition, the receiver 10 causes the noise reduction filter unit 32 to work on the operation result, that is, the offset obtained by Equation (3) in the offset calculating unit 30, and thus it is possible to reduce the influence caused by a potential change in a forward-path delay time and a return-path delay time for each packet.

However, when a method intended for solving problems caused by using the mode based on the IEEE1588 PTP standard is used, for example, as illustrated in FIG. 2, the receiver 10 is necessary to be provided with the noise reduction filter unit 32, and thus a delay in the control of the receiver 10 is more likely to occur due to the process in the noise reduction filter unit 32. In addition, the difference between average values of a forward-path delay time (delay time taken from a transmitter to a receiver) and the return-path delay time (delay time taken from a receiver to a transmitter) may be an offset error.

Thus, for example, even when a method intended for solving problems caused by using the mode based on the IEEE1588 PTP standard is used, it is not necessarily that the time of a clock in a receiver can be corrected more accurately.

Moreover, as described above, for example, when the technique disclosed in JP 2010-232845A is used, it will be necessary to provide the minimum value of a delay time to the receiver in advance as a condition for estimating the delay time. Thus, for example, even when the technique disclosed in JP 2010-232845A is used, it is not necessarily that the time of a clock in a receiver can be corrected more accurately by using the minimum value of the delay time provided in advance.

[III] Overview of Method of Calculating Time Difference According to an Embodiment of the Present Disclosure If the delay of a network is considered to be classified into two components of a fixed delay component and a variable delay component, then the fixed delay component may correspond to a minimum delay time when there is no influence of the output queue delay of a switch and the variable delay component may correspond to the magnitude to be influenced by the output queue delay of a switch. For example, as in the case of using the method intended for solving problems caused by using the mode based on the IEEE1588 PTP standard, the receiver according to an embodiment of the present disclosure calculates a fixed delay component in a first delay time corresponding to the forward-path delay time and a second delay time corresponding to the return-path delay time as "time difference between the time of a clock in a transmitter and the time of a clock in a receiver" (hereinafter sometimes referred simply to as "time difference") by using a logical operation without being provided with any noise reduction filter such as a low-pass filter.

More specifically, the receiver according to an embodiment of the present disclosure calculates "time difference between the time of a clock in a transmitter and the time of a clock in a receiver" by, for example, using (1) a process of calculating a first delay time, (2) a process of calculating a second delay time, and (3) a process of calculating time difference, which are described below.

(1) Process of Calculating First Delay Time

The receiver according to an embodiment of the present disclosure calculates the first delay time indicating a time lag between transmission of a transmission signal and reception of the transmission signal by the receiver. The receiver according to an embodiment of the present disclosure calculates the first delay time based on, for example, the first time information indicating a time at which a transmitter sends a transmission signal and the second time information indicating a time at which the receiver receives the transmission signal.

More specifically, the receiver according to an embodiment of the present disclosure performs the operation, for example, shown in Equation (1) as a process related to the process of calculating the first delay time. In Equation (1), t1 corresponds to the time indicated by the first time information, and t2 corresponds to the time indicated by the second time information. In other words, the first delay time according to an embodiment of the present disclosure corresponds to the forward-path delay time.

Here, examples of the transmission signal according to an embodiment of the present disclosure include the Sync message shown in FIG. 1, and time information indicating the Sync reception time t2 shown in FIG. 1 corresponds to the second time information. In addition, time information indicating the Sync transmission time t1 contained in the FollowUp message shown in FIG. 1 corresponds to the first time information. The transmission signal, the first time information and the second time information according to an embodiment of the present disclosure are, of course, not limited to the application of signals transmitted or received using the communication based on the IEEE1588 PTP standard in FIG. 1.

(2) Process of Calculating Second Delay Time

The receiver according to an embodiment of the present disclosure calculates the second delay time indicating a time lag between transmission of a transmission signal by a receiver and reception of a response signal corresponding to the transmission signal by a transmitter. The receiver according to an embodiment of the present disclosure calculates the second delay time, for example, based on the third time information indicating a time at which the receiver transmits the response signal and the fourth time information indicating a time when the transmitter receives the response signal.

More specifically, the receiver according to an embodiment of the present disclosure performs the operation, for example, shown in Equation (2) as a process related to the process of calculating the second delay time. In Equation (2), t3 corresponds to the time indicated by the third time information, and t4 corresponds to the time indicated by the fourth time information. In other words, the second delay time according to an embodiment of the present disclosure corresponds to the return-path delay time.

Here, examples of the response signal according to an embodiment of the present disclosure include the DelayRequest message shown in FIG. 1, and time information indicating the DelayRequest transmission time t3 shown in FIG. 1 corresponds to the third time information. In addition, for example, time information indicating the DelayRequest reception time t4 contained in the DelayResponse message shown in FIG. 1 corresponds to the fourth time information. The response signal, the third time information and the fourth time information according to an embodiment of the present disclosure are, of course, not limited to the application of signals transmitted or received using the communication based on the IEEE1588 PTP standard in FIG. 1.

(3) Process of Calculating Time Difference

The receiver according to an embodiment of the present disclosure calculates time difference based on the first delay time calculated by the process of (1) (the process of calculating the first delay time) and the second delay time calculated by the process of (2) (the process of calculating the second delay time). Here, in the process of calculating the time difference, a fixed delay component in the first delay time and the second delay time is calculated as a time lag by using a logical operation without using any filter. In addition, in the process of calculating the time difference, it is not necessary to know a minimum value of a delay time in advance, unlike the technique, for example, disclosed in JP 2010-232845A. A specific example of the process of calculating the time difference according to an embodiment of the present disclosure will be described later.

The receiver according to an embodiment of the present disclosure calculates "time difference between the time of a clock in a transmitter and the time of a clock in a receiver", for example, by performing the process of (1) (the process of calculating the first delay time), the process of (2) (the process of calculating the second delay time), and the process of (3) (the process of calculating time difference) as the process related to the method of calculating time difference according to an embodiment of the present disclosure.

Here, in the process of (3) (the process of calculating time difference), the receiver according to an embodiment of the present disclosure calculates a fixed delay component in the first delay time and the second delay time as a time lag using a logical operation without using any filter. Thus, the receiver according to an embodiment of the present disclosure can prevent such control delay due to the process using a filter or occurrence of an offset error as the case of using the method intended for solving problems caused by suing the mode based on the IEEE1588 PTP standard.

Furthermore, in the process of (3) (the process of calculating time difference), the receiver according to an embodiment of the present disclosure is not necessary to know previously those such as a minimum value of delay time, and thus the time difference is more likely to be calculated more accurately than in the case of using the technique, for example, disclosed in JP 2010-232845A.

Therefore, the receiver according to an embodiment of the present disclosure can calculate time difference between the time of a clock in a transmitter and the time of a clock in the receiver more accurately.

Note that, the process related to the method of calculating time difference according to an embodiment of the present disclosure is not limited to the process of (1) (the process of calculating the first delay time) through the process of (3) (the process of calculating time difference).

For example, the receiver according to an embodiment of the present disclosure may further perform a process of correcting the time of a clock in the receiver (a correction process) based on the time difference calculated by performing the process of (3) (the process of calculating time difference).

Here, examples of the correction process according to an embodiment of the present disclosure may include a process of adjusting a clock signal used to control a count value of a counter based on the calculated time difference (a process of correcting a value of a counter indirectly) and a process of rewriting a value of a counter based on the calculated time difference (a process of correcting a value of a counter directly).

For example, as illustrated with reference to FIG. 2, a value of a counter (a count value) included in the receiver is used to generate time information. Thus, the receiver according to an embodiment of the present disclosure can correct the time of a clock in the receiver by changing a value of a counter directly or indirectly in the correction process according to an embodiment of the present disclosure.

(Receiver According to an Embodiment of the Present Disclosure)

Next, an exemplary configuration of the receiver according to an embodiment of the present disclosure capable of performing the process related to the method of calculating time difference according to an embodiment of the present disclosure described above will be described.

In the following, the description will be given taking a case where the receiver and the transmitter according to an embodiment of the present disclosure perform, for example, the reception and transmission of signals based on the IEEE1588 PTP standard illustrated in FIG. 1 as an example. Note that, the signal that is received and transmitted between the receiver and the transmitter according to an embodiment of the present disclosure is, of course, not limited to signals based on the IEEE1588 PTP standard illustrated in FIG. 1.

Receiver According to First Embodiment

Figure 4:
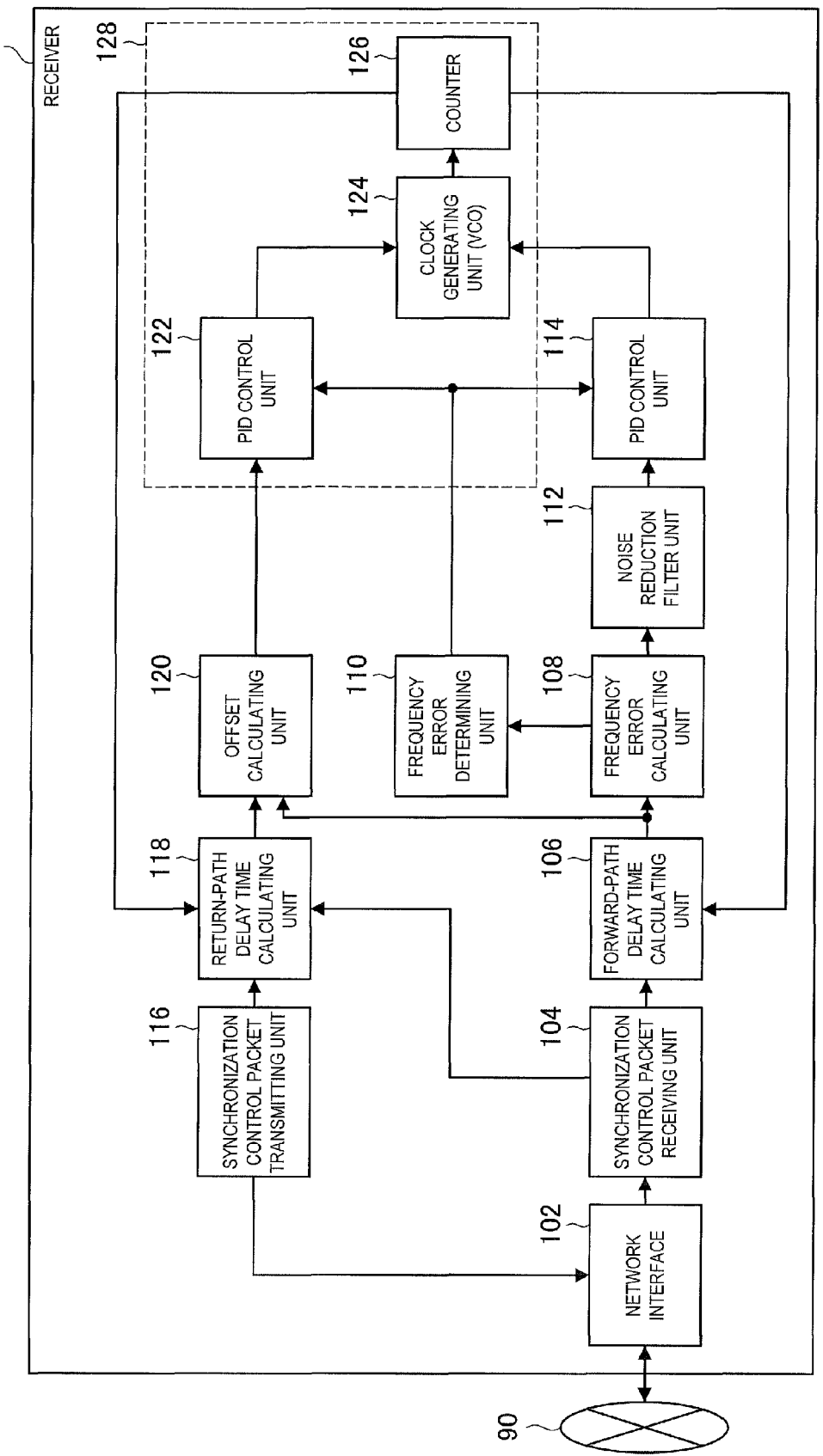
FIG. 4 is a block diagram illustrating an exemplary configuration of the receiver according to a first embodiment.

FIG. 4 is a block diagram illustrating an exemplary configuration of the receiver 100 according to a first embodiment. FIG. 4 also illustrates a network 90 through which the receiver communicates with a transmitter. Note that, the receiver 100 may be configured to perform a direct communication with a transmitter, for example, without through the network 90.

The receiver 100 is configured to include, for example, a network interface 102, a synchronization control packet receiving unit 104, a forward-path delay time calculating unit 106 (a unit for calculating a first delay time, or simply a first delay time calculating unit), a frequency error calculating unit 108, a frequency error determining unit 110, a noise reduction filter unit 112, a PID control unit 114, a synchronization control packet transmitting unit 116, a return-path delay time calculating unit 118 (a unit for calculating a second delay time, or simply a second delay time calculating unit), an offset calculating unit 120 (a time difference calculating unit), a PID control unit 122, a clock generating unit 124, and a counter 126.

Furthermore, the receiver 100 is configured to include, for example, a controller (not shown) that includes an MPU or various types of processing circuits for controlling the entire receiver 100, or include a time information generating unit (not shown) that generates time information. In addition, the receiver 100 may be configured to include, for example, a timing signal generating unit (not shown) that generates a timing signal used to synchronize and process various types of signals such as image signals.

Here, in FIG. 4, the forward-path delay time calculating unit 106, the return-path delay time calculating unit 118, and the offset calculating unit 120 are used to perform the process of (1) (the process of calculating the first delay time), the process of (2) (the process of calculating the second delay time), and the process of (3) (the process of calculating the time difference), respectively, for the method of calculating time difference according to an embodiment of the present disclosure.

Moreover, in FIG. 4, for example, the PID control unit 122, the clock generating unit 124, and the counter 126 serve as a correction unit 128 that performs the correction process in accordance with the method of calculating time difference according to an embodiment of the present disclosure.

Furthermore, the network interface 102, the synchronization control packet receiving unit 104, the frequency error calculating unit 108, the frequency error determining unit 110, the noise reduction filter unit 112, the PID control unit 114, and the synchronization control packet transmitting unit 116 are similar in structure and function to the network interface 12, the synchronization control packet receiving unit 14, the frequency error calculating unit 18, the frequency error determining unit 20, the noise reduction filter unit 22, the PID control unit 24, and the synchronization control packet transmitting unit 26, respectively, which are illustrated in FIG. 2.

Structural elements used to perform the method of calculating time difference according to an embodiment of the present disclosure in the receiver 100 will be described below, and explanation of structural elements that have a structure and function similar to that of the receiver 10 illustrated in FIG. 2 is omitted.

[1-1] Configuration Related to Calculation of Time Difference (an Offset) Between the Time of a Clock in a Transmitter and the Time of a Clock in a Receiver The forward-path delay time calculating unit 106 serves to perform the process of (1) (the process of calculating the first delay time) and calculates the first delay time based on the time t1 indicated by the first time information and the time t2 indicated by the second time information.

More specifically, the forward-path delay time calculating unit 106 is configured to include, for example, an adder to perform an operation shown in Equation (4) (the equation equivalent to Equation (1)) which will be described later. Then, the forward-path delay time calculating unit 106 transmits an operation result Δ21(j) obtained by Equation (4) described later to the offset calculating unit 120 or the like as the first delay time.

The return-path delay time calculating unit 118 serves to perform the process of (2) (the process of calculating the second delay time) and calculates the second delay time based on the time t3 indicated by the third time information and the time t4 indicated by the fourth time information.

More specifically, the return-path delay time calculating unit 118 is configured to include, for example, an adder to perform the operation shown in Equation (5) (the equation equivalent to Equation (2)) which will be described later. Then, the return-path delay time calculating unit 118 transmits an operation result Δ43(j) obtained by Equation (5) described later to the offset calculating unit 120 as the second delay time.

The offset calculating unit 120 serves to perform the process of (3) (the process of calculating time difference) and calculates "time difference between the time of a clock in a transmitter and the time of a clock in a receiver" based on the first delay time calculated by the forward-path delay time calculating unit 106 and the second delay time calculated by the return-path delay time calculating unit 118.

The process for performing the method of calculating time difference according to an embodiment of the present disclosure in the receiver 100 will be described in more detail below.

The following assumptions are given to the receiver 100 when the process for performing the method of calculating time difference according to an embodiment of the present disclosure is used.

Assumption 1

It is stable in a state where a frequency control is completed and a clock frequency of a transmitter is coincident with that of a receiver.

Assumption 2

The network delay is classified into two components: a fixed delay component (hereinafter sometimes referred to as "fixed_delay") and a variable delay component (hereinafter sometimes referred to as "variable_delay").

Assumption 3

The fixed_delay is independent on the direction of communications.

Furthermore, hereinafter, terms "t1(j)", "t2(j)", "t3(j)", "t4(j)", "delay_ms(j)", "delay_sm(j)", and "Offset" are used to represent the definitions as follows:

t1(j): j-th sync transmission time
t2(j): j-th sync reception time
t3(j): j-th DelayRequest transmission time
t4(j): j-th DelayRequest reception time
delay_ms(j): j-th forward-path delay time (a delay time in the direction from a transmitter to a receiver)
delay_sm(j): j-th return-path delay time (a delay time in the direction from a receiver to a transmitter)
Offset: time difference (an offset) between the time of a clock in a transmitter and the time of a clock in a receiver

[1-1-1] Specific Example of the Process in the Forward-Path Delay Time Calculating Unit 106 and the Return-Path Delay Time Calculating Unit 118

From the above Assumption 1, Equations (4) and (5) described below are satisfied. The forward-path delay time calculating unit 106 calculates the first delay time by performing the operation shown in Equation (4) below. In addition, the return-path delay time calculating unit 118 calculates the second delay time by performing the operation shown in Equation (5) below.

$$\Delta 21(j) = \text{delay\_}ms(j) + \text{offset} = t2(j) - t1(j) \quad (4)$$

$$\Delta 43(j) = \text{delay\_}sm(j) - \text{offset} = t4(j) - t3(j) \quad (5)$$

[1-1-2] Specific Example of the Process in the Offset Calculating Unit 120

Figure 5:
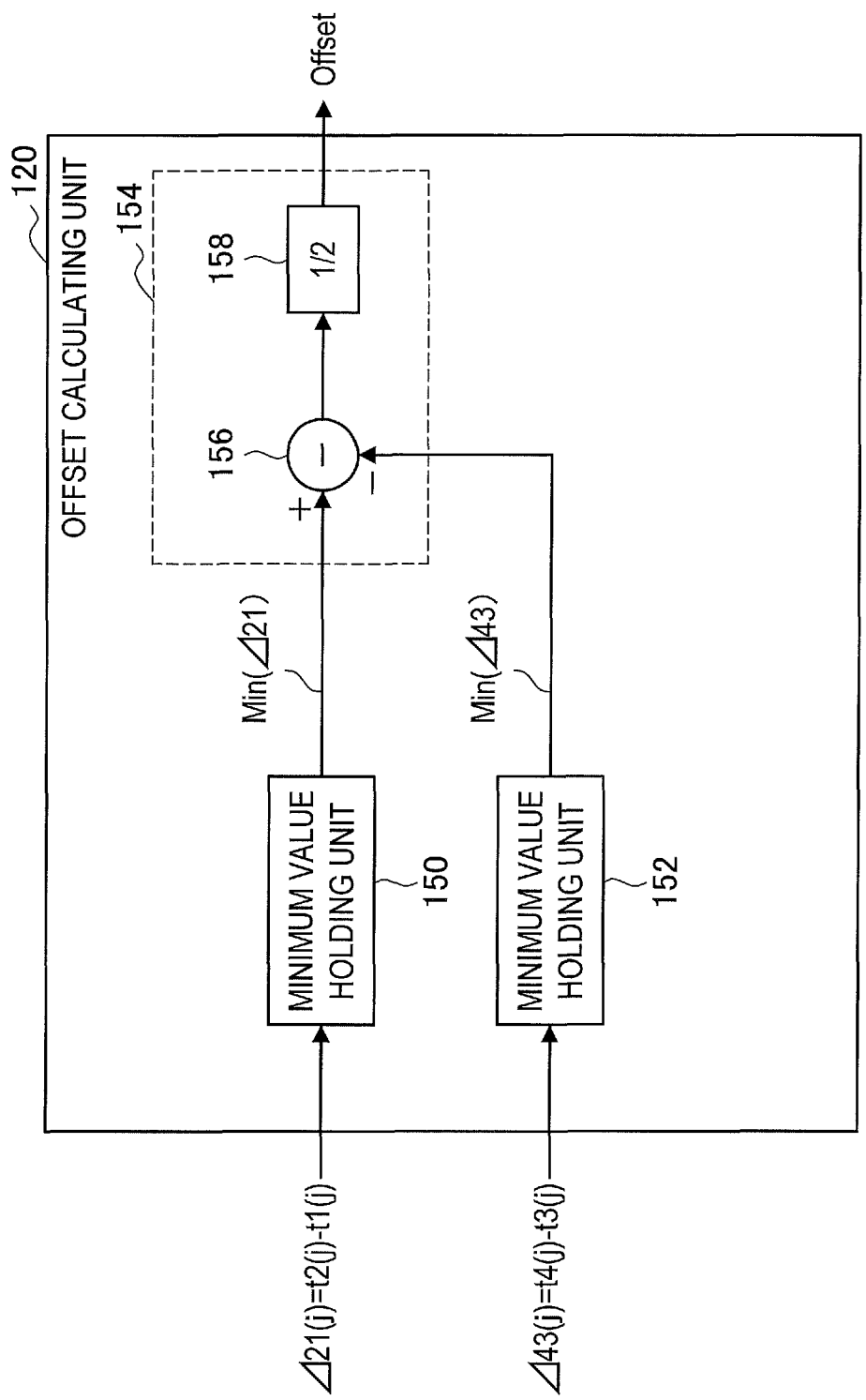
FIG. 5 is a block diagram illustrating an exemplary configuration of an offset calculating unit included in the receiver according to the first embodiment.

FIG. 5 is a block diagram illustrating an exemplary configuration of the offset calculating unit 120 included in the receiver 100 according to the first embodiment. In FIG. 5, the first delay time transmitted from the forward-path delay time calculating unit 106 is represented as "Δ21(j)", and the second delay time transmitted from the return-path delay time calculating unit 118 is represented as "Δ43(j)". Additionally, in FIG. 5, the calculated time difference (offset) outputted from the offset calculating unit 120 is represented as "Offset".

The offset calculating unit 120 is configured to include a minimum value holding unit 150 (a first minimum value holding unit), a minimum value holding unit 152 (a second minimum value holding unit), and a calculation unit 154.

The minimum value holding unit 150 is configured to include a hold circuit or the like to hold a minimum value of the first delay time calculated in the forward-path delay time calculating unit 106. Then, the minimum value holding unit 150 outputs the held minimum value of the first delay time, Min(Δ21).

The minimum value holding unit 152 is configured to include a hold circuit or the like to hold a minimum value of the second delay time calculated in the return-path delay time calculating unit 118. Then, the minimum value holding unit 152 outputs the held minimum value of the second delay time, Min(Δ43).

The calculation unit 154 calculates time difference (an offset) based on the minimum value Min(Δ21) of the first delay time and the minimum value Min(Δ43) of the second delay time.

The calculation unit 154 is configured to include, for example, an adder 156 and a multiplier 158. Here, if the calculation unit 154 illustrated in FIG. 5 is compared with the offset calculating unit 30 illustrated in FIG. 3, it is found that the calculation unit 154 has a configuration similar to that of the offset calculating unit 30. In other words, the calculation unit 154 calculates a time lag by performing an operation similar to that of the offset calculating unit 30 illustrated in FIG. 3 using the minimum value Min(Δ21) of the first delay time and the minimum value Min(Δ43) of the second delay time. More specifically, the calculation unit 154 calculates the time difference, for example, by performing an operation shown in Equation (10) which will be described later.

Note that, the configuration of the calculation unit 154 is not limited thereto. For example, the calculation unit 154 may be configured to include a divider that divides a calculated difference value by 2 instead of the multiplier 158.

The process in the offset calculating unit 120 will be described in more detail below.

From the above Assumptions 2 and 3, Equations (6) and (7) are satisfied as follows.

$$\text{Delay\_}ms(j) = \text{fixed\_delay} + \text{variable\_delay\_}ms(j) \quad (6)$$

$$\text{Delay\_}sm(j) = \text{fixed\_delay} + \text{variable\_delay\_}sm(j) \quad (7)$$

The offset calculating unit 120 includes the minimum value holding unit 150 and the minimum value holding unit 152, and thus a new sample sequence min{Δ21(j)} obtained by updating a minimum value of Δ21(j) and a new sample sequence min{Δ43(j)} obtained by updating a minimum value of Δ43(j) are introduced to the offset calculating unit 120.

Here, the sample sequence min{Δ21(j)} and the sample sequence min{Δ43(j)} approximate gradually to "variable_delay_ms=0", and consequentially "delay_ms=delay_sm=fixed_delay" is satisfied. Thus, for example, the following Equations (8) and (9) are satisfied.

$$\min\{\Delta 21(j)\} = \text{fixed\_delay} + \text{offset} \quad (8)$$

$$\min\{\Delta 43(j)\} = \text{fixed\_delay} - \text{offset} \quad (9)$$

From the above Equations (8) and (9), the following Equation (10) can be obtained. The calculation unit 154 calculates time difference by performing the operation shown in Equation (10) below.

$$\text{offset} = \{\text{Min}(\Delta 21) - \text{Min}(\Delta 43)\} \times (\tfrac{1}{2}) \quad (10)$$

Figure 6:
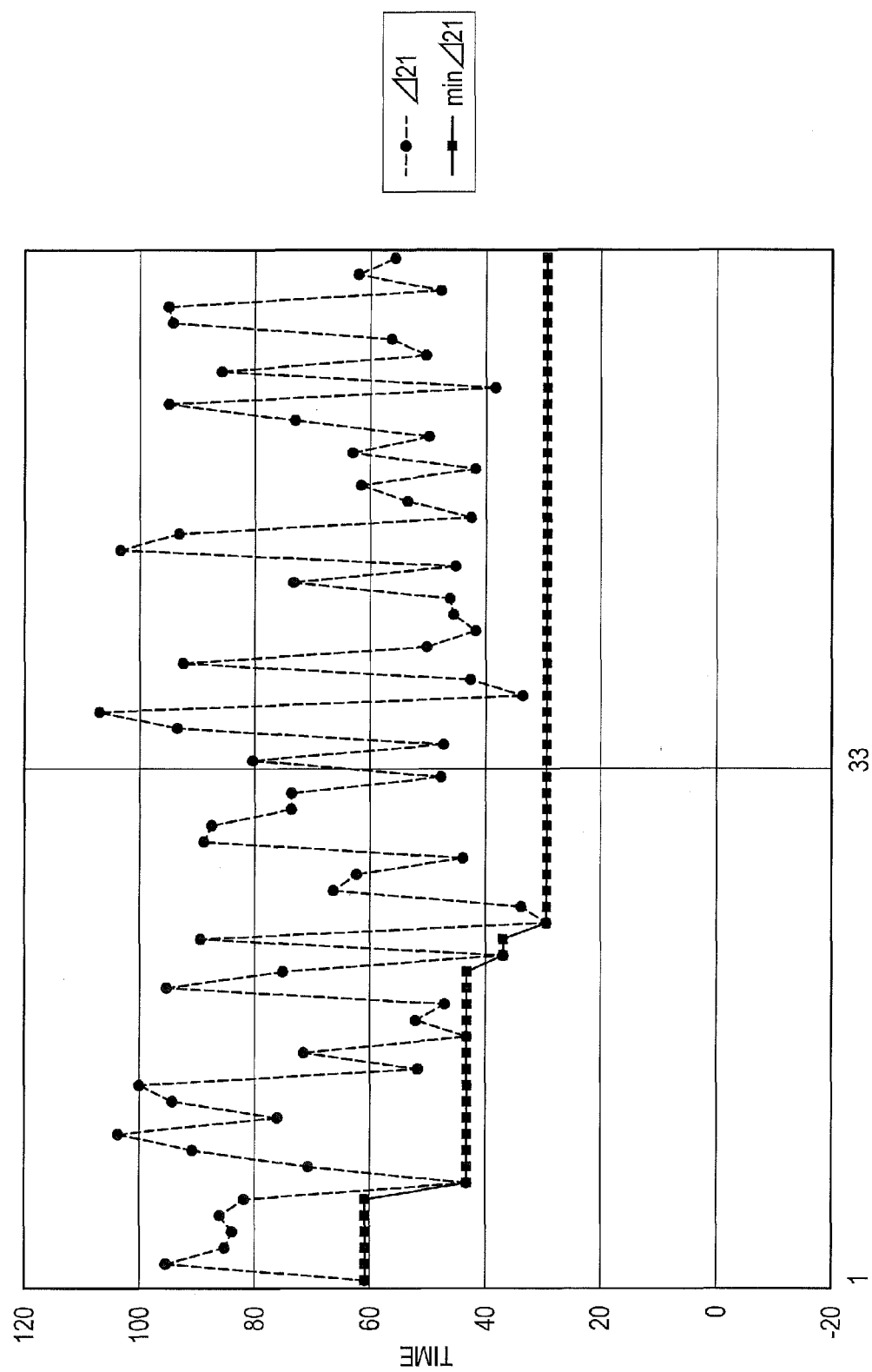
FIG. 6 is a diagram for explaining an example of the procedure of a process in the offset calculating unit included in the receiver according to the first embodiment.
Figure 7:
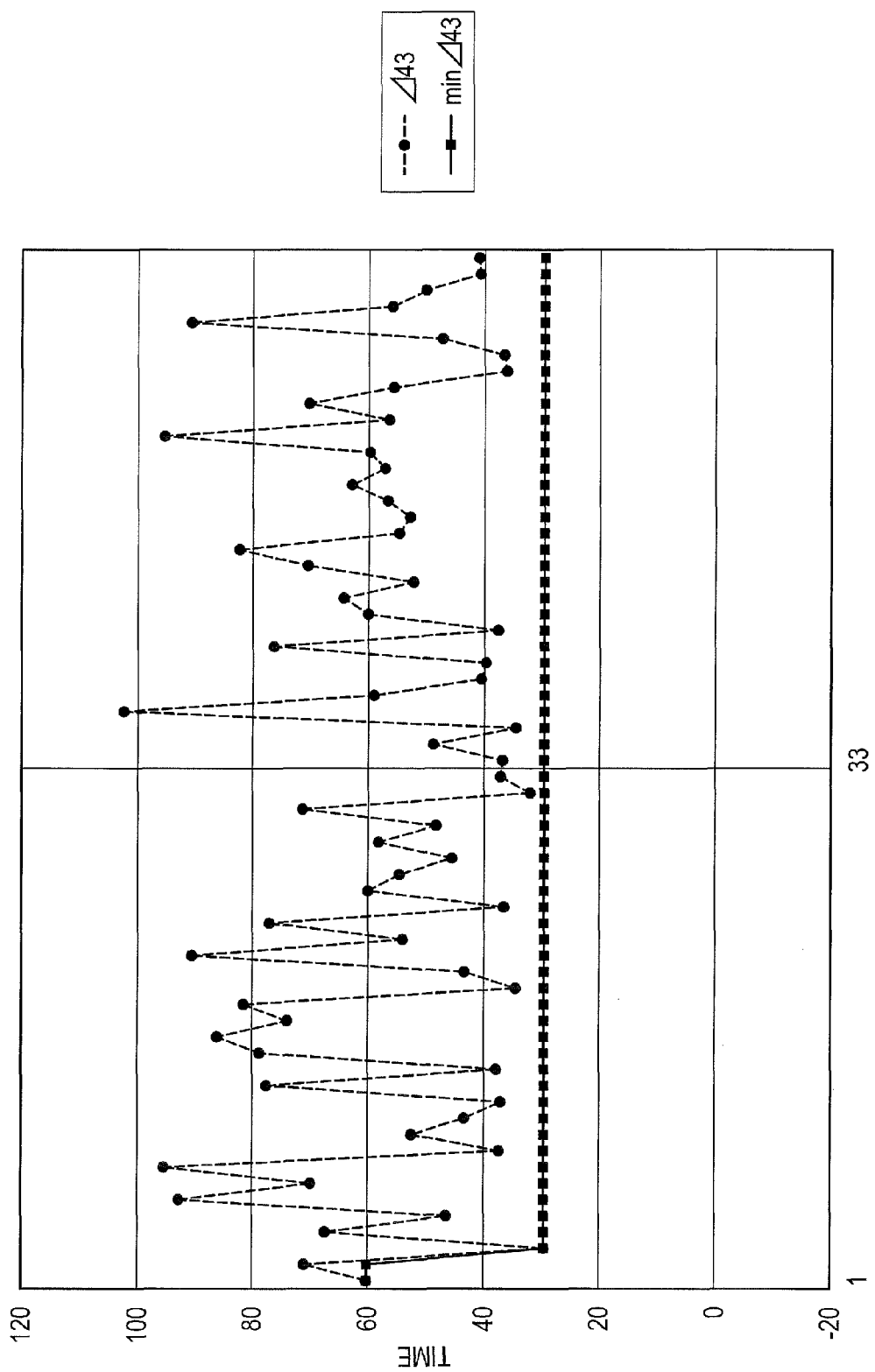
FIG. 7 is a diagram for explaining an example of the procedure of a process in the offset calculating unit included in the receiver according to the first embodiment.
Figure 8:
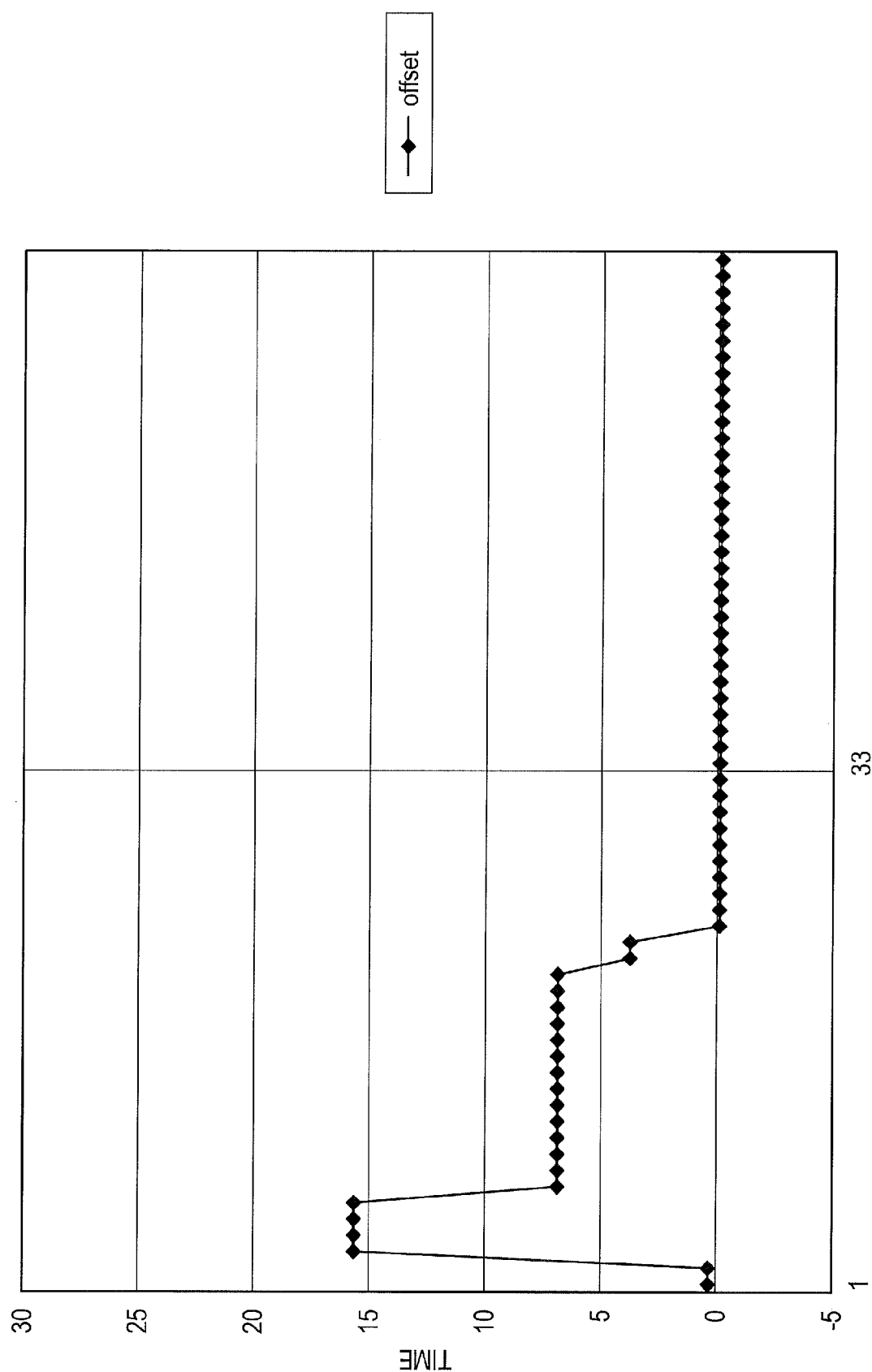
FIG. 8 is a diagram for explaining an example of the procedure of a process in the offset calculating unit included in the receiver according to the first embodiment.

FIGS. 6 to 8 are diagrams for explaining an example of the procedure of a process in the offset calculating unit 120 included in the receiver 100 according to the first embodiment. FIGS. 6 to 8 are graphs using sample data in which time difference (an offset) equals to zero, and the vertical axis represents the delay time and the horizontal axis represents the sample number. FIG. 6 shows states of Δ21(j) and min{Δ21(j)}. FIG. 7 shows states of Δ43(j) and min{Δ43(j)}. In addition, FIG. 8 shows states of Offset (that is, a time lag) calculated by Equation (10).

For example, as shown in FIG. 8, it is found that the time lag (an offset) calculated in the offset calculating unit 120 converges to zero.

[1-2] Configuration for Correction Process

The correction unit 128 corrects the time of a clock in the receiver 100 based on the time difference calculated in the offset calculating unit 120.

The correction unit 128 is configured to include, for example, the PID control unit 122, the clock generating unit 124, and the counter 126. The PID control unit 122 the clock generating unit 124, and the counter 126 have a similar function and structure similar to that of the PID control unit 34, the clock generating unit 36, and the counter 38, respectively, which are illustrated in FIG. 2.

The correction unit 128 adjusts a clock signal used to control a count value in the counter 126 based on the time difference calculated in the offset calculating unit 120. In other words, the correction unit 128 changes indirectly a count value in the counter 126 by adjusting a clock signal generated by the clock generating unit 124 based on the time difference calculated in the offset calculating unit 120.

Here, for example, as illustrated with reference to FIG. 2, a value of the counter (a count value) included in the receiver 100 is used to generate time information. Thus, the indirect change in a count value of the counter 126 makes it possible for the correction unit 128 to correct the time of a clock in the receiver 100.

The receiver 100 according to the first embodiment performs the process for the method of calculating time difference according to an embodiment of the present disclosure (for example, the processes of (1) (the process of calculating the first delay time) to (3) (the process of calculating time difference) and the correction process), for example, using the configuration illustrated in FIG. 4.

Therefore, the receiver 100 according to the first embodiment can calculate time difference between the time of a clock in a transmitter and the time of a clock in the receiver, for example, using the configuration illustrated in FIG. 4.

Furthermore, the receiver 100 according to the first embodiment is not necessary to use a filter upon the calculation of time difference or to know a minimum value of the delay time or the like in advance. Thus, the receiver 100 according to the first embodiment can prevent the control delay due to the process using a filter or the occurrence of offset errors, for example, using the configuration illustrated in FIG. 4, and, in addition, the receiver 100 can calculate time difference between the time of a clock in a transmitter and the time of a clock in the receiver more accurately.

Note that, the configuration of the receiver according to the first embodiment is not limited to the configuration illustrated in FIG. 4.

For example, the receiver according to the first embodiment may be a time difference calculating device configured to include structural elements that perform the process for the method of calculating time difference according to an embodiment of the present disclosure (for example, "the processes of (1) (the process of calculating the first delay time) to (3) (the process of calculating time difference)" or "the processes of (1) (the process of calculating the first delay time) to (3) (the process of calculating time difference) and the correction process). If the receiver according to the first embodiment is the time difference calculating device, then, for example, the receiver according to the first embodiment can be incorporated into a receiver communicating with a transmitter, and thus the configuration illustrated in FIG. 4 is obtained.

Receiver According to a Second Embodiment

Figure 9:
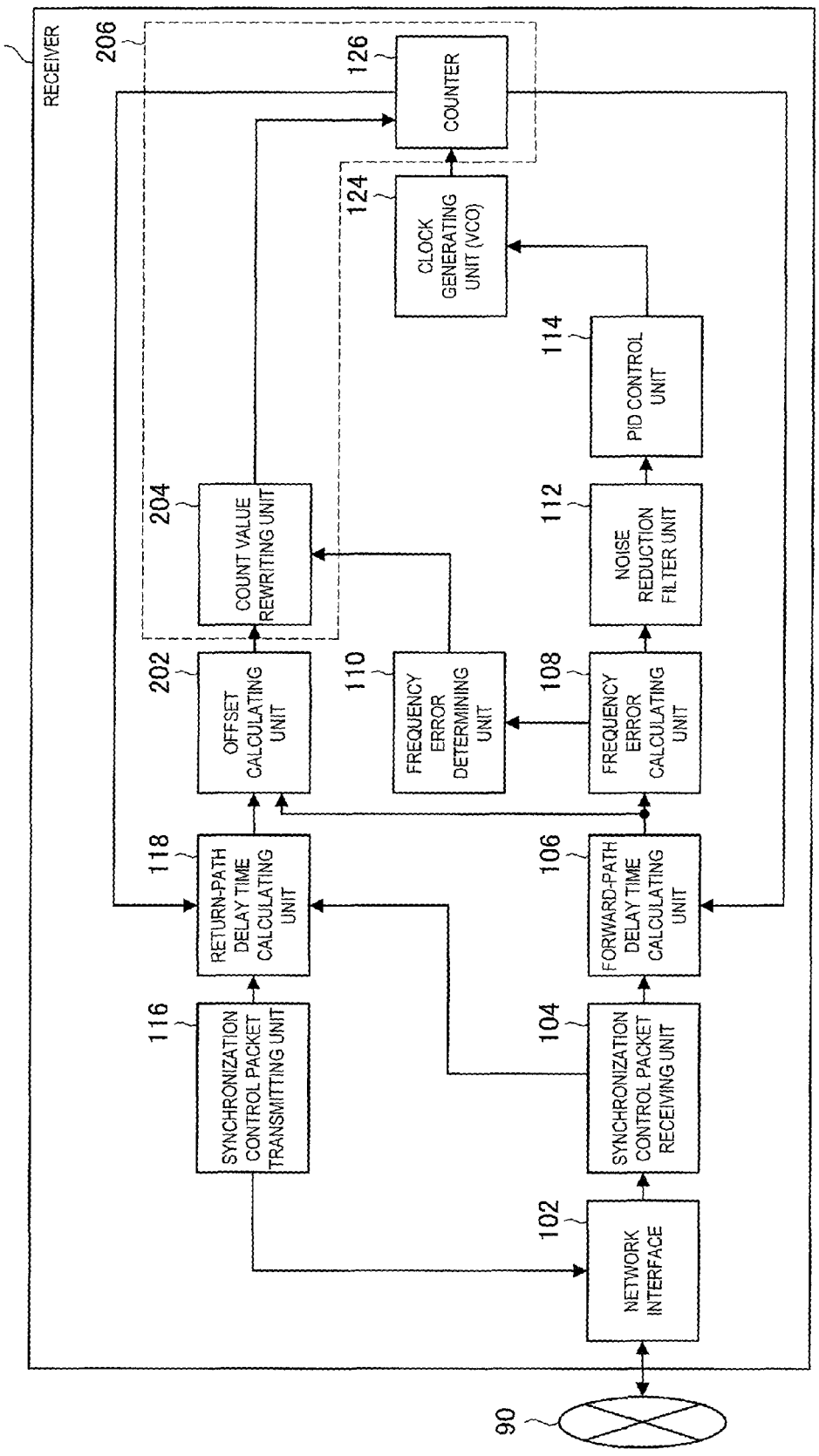
FIG. 9 is a block diagram illustrating an exemplary configuration of a receiver according to a second embodiment.

FIG. 9 is a block diagram illustrating an exemplary configuration of a receiver 200 according to a second embodiment. In FIG. 9, there is also illustrated a network 90 through which the receiver communicates with a transmitter. Alternatively, the receiver 200 may be configured to perform a direct communication with a transmitter, for example, without through the network 90.

The receiver 200 is configured to include, for example, a network interface 102, a synchronization control packet receiving unit 104, a forward-path delay time calculating unit 106 (a first delay time calculating unit), a frequency error calculating unit 108, a frequency error determining unit 110, a noise reduction filter unit 112, a PID control unit 114, a synchronization control packet transmitting unit 116, a return-path delay time calculating unit 118 (a second delay time calculating unit), an offset calculating unit 202 (a time difference calculating unit), a count value rewriting unit 204, a clock generating unit 124, and a counter 126.

Furthermore, the receiver 200 is configured to, for example, include a controller (not shown) that is configured to include an MPU or various types of processing circuits for controlling the entire receiver 200, or include a time information generating unit (not shown) that generates time information. In addition, the receiver 200 may be configured to include, for example, a timing signal generating unit (not shown) that generates a timing signal used to synchronize and process various types of signals such as image signals.

In FIG. 9, the forward-path delay time calculating unit 106, the return-path delay time calculating unit 118, and the offset calculating unit 202 are used to perform the process of (1) (the process of calculating the first delay time), the process of (2) (the process of calculating the second delay time), and the process of (3) (the process of calculating time difference), respectively, for the method of calculating time difference according to an embodiment of the present disclosure.

Moreover, in FIG. 9, for example, the count value rewriting unit 204 and the counter 126 serve as a correction unit 206 that performs the correction process for the method of calculating time difference according to an embodiment of the present disclosure.

Furthermore, the network interface 102, the synchronization control packet receiving unit 104, the frequency error calculating unit 108, the noise reduction filter unit 112, the PID control unit 114, the synchronization control packet transmitting unit 116, and the clock generating unit 124 have a configuration and function similar to that of the network interface 12, the synchronization control packet receiving unit 14, the frequency error calculating unit 18, the noise reduction filter unit 22, the PID control unit 24, the synchronization control packet transmitting unit 26, and the clock generating unit 36, respectively, which are illustrated in FIG. 2. In addition, the frequency error determining unit 110 controls the operation of the count value rewriting unit 204 based on a calculation result calculated by the frequency error calculating unit 18 and transmitted from the frequency error determining unit 108 at the time when it is checked that the calculation result falls within a given frequency pull-in range. The frequency error determining unit 110 corresponds to a mechanism for causing the time control to be preceded by the clock frequency control in the receiver 200.

Structural elements used to perform the method of calculating time difference according to an embodiment of the present disclosure in the receiver 200 will be described below, and explanation of structural elements that have function and structure similar to those of the receiver 10 illustrated in FIG. 2 is omitted.

[2-1] Configuration for Calculating Time Difference (Offset) Between the Time of a Clock in a Transmitter and the Time of a Clock in the Receiver The forward-path delay time calculating unit 106 has similar function and structure to those of the forward-path delay time calculating unit 106 according to the first embodiment illustrated in FIG. 4, and is used to perform the process of (1) (the process of calculating the first delay time). The forward-path delay time calculating unit 106 calculates the first delay time based on the time t1 indicated by the first time information and the time t2 indicated by the second time information.

The return-path delay time calculating unit 118 has similar function and structure to those of the return-path delay time calculating unit 118 according to the first embodiment illustrated in FIG. 4, and is used to perform the process of (2) (the process of calculating the second delay time). The return-path delay time calculating unit 118 calculates the second delay time based on the time t3 indicated by the third time information and the time t4 indicated by the fourth time information.

The offset calculating unit 202 is used to perform the process of (3) (the process of calculating time difference), and calculates "time difference between the time of a clock in a transmitter and the time of a clock in the receiver" based on the first delay time calculated in the forward-path delay time calculating unit 106 and the second delay time calculated in the return-path delay time calculating unit 118.

The process for the method of calculating time difference according to an embodiment of the present disclosure in the receiver 200 will be described in more detail below.

The following assumptions are given to the receiver 200 when the process for performing the method of calculating time difference according to an embodiment of the present disclosure is used.

Assumption 1

It is stable in a state where a frequency control is completed and a clock frequency of a transmitter is coincident with that of a receiver.

Assumption 2

The network delay is classified into two components: a fixed delay component (hereinafter sometimes referred to as "fixed_delay") and a variable delay component (hereinafter sometimes referred to as "variable_delay").

Assumption 3

The fixed_delay is independent on the direction of communications.

Furthermore, hereinafter, terms "t1(j)", "t2(j)", "t3(j)", "t4(j)", "delay_ms(j)", "delay_sm(j)", and "Offset" are used to represent the definitions as follows:

t1(j): j-th sync transmission time
t2(j): j-th sync reception time
t3(j): j-th DelayRequest transmission time
t4(j): j-th DelayRequest reception time
delay_ms(j): j-th forward-path delay time (a delay time in the direction from a transmitter to a receiver)
delay_sm(j): j-th return-path delay time (a delay time in the direction from a receiver to a transmitter)
Offset: time difference (an offset) between the time of a clock in a transmitter and the time of a clock in the receiver

[2-1-1] Specific Example of a Process in the Forward-Path Delay Time Calculating Unit 106 and the Return-Path Delay Time Calculating Unit 118

From the above Assumption 1, Equations (4) and (5) described above are satisfied. The forward-path delay time calculating unit 106 calculates the first delay time by performing the operation shown in Equation (4) in a similar way to the forward-path delay time calculating unit 106 according to the first embodiment illustrated in FIG. 4. In addition, the return-path delay time calculating unit 118 calculates the second delay time by performing the operation shown in Equation (5) in a similar way to the return-path delay time calculating unit 118 according to the first embodiment illustrated in FIG. 4.

[2-1-2] Specific Example of a Process in the Offset Calculating Unit 202

Figure 10:
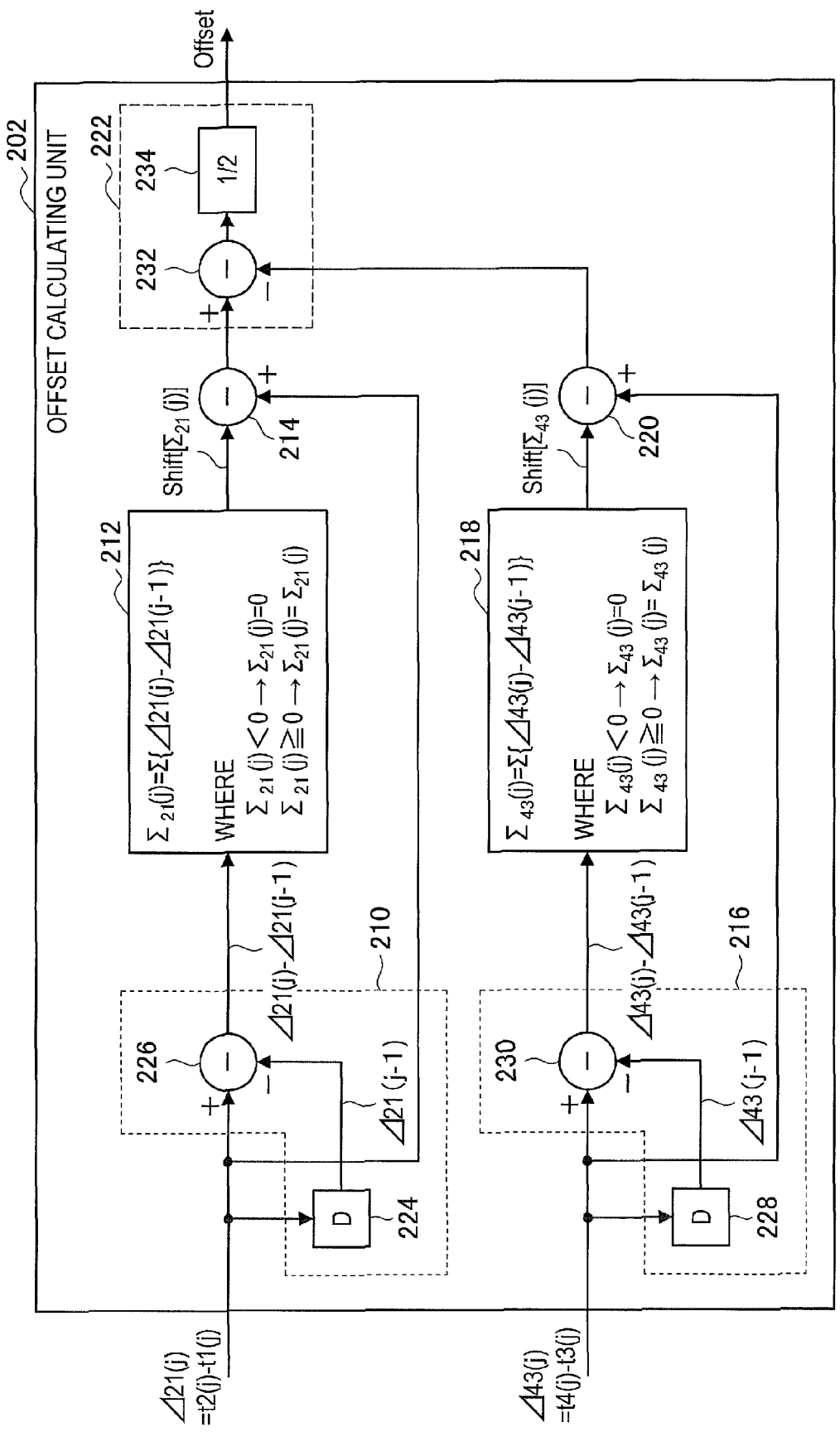
FIG. 10 is a block diagram illustrating an exemplary configuration of an offset calculating unit included in the receiver according to the second embodiment.

FIG. 10 is a block diagram illustrating an exemplary configuration of the offset calculating unit 202 included in the receiver 200 according to the second embodiment. In FIG. 10, the first delay time transmitted from the forward-path delay time calculating unit 106 is represented as "$\Delta21(j)$", and the second delay time transmitted from the return-path delay time calculating unit 118 is represented as "$\Delta43(j)$". Additionally, in FIG. 10, the calculated time difference (offset) outputted from the offset calculating unit 202 is represented as "Offset".

The offset calculating unit 202 is configured to include a first inter-sample time lag calculating unit 210, a first shift value calculating unit 212, a first difference value calculating unit 214, a second inter-sample time lag calculating unit 216, a second shift value calculating unit 218, a second difference value calculating unit 220, and a calculation unit 222.

The first inter-sample time lag calculating unit 210 is configured to include, for example, a delay unit 224 and an adder 226, and calculates a time lag between temporally consecutive samples of the calculated first delay time. In FIG. 10, the time lag between samples of the first delay time is represented as "$\Delta21W-\Delta21(j-1)$".

The first shift value calculating unit 212 accumulates the time lag between samples of the first delay time calculated in the first inter-sample time lag calculating unit 210. Then, the first shift value calculating unit 212 calculates a first shift value obtained by shifting the accumulated value by a predetermined value. An example of the first shift value according to an embodiment of the present disclosure will be described later. In addition, the first shift value calculating unit 212 is configured to include, for example, a circuit having any configuration capable of performing an accumulation operation and a shift operation. In FIG. 10, the first shift value is represented as "$\mathrm{Shift}[\Sigma_{21}(j)]$".

The first difference value calculating unit 214 is configured to include, for example, an adder, and outputs a first difference value that is the difference value between the first delay time calculated in the forward-path delay time calculating unit 106 and the first shift value.

The second inter-sample time lag calculating unit 216 is configured to include, for example, a delay unit 228 and an adder 230, and calculates a time lag between temporally consecutive samples of the calculated second delay time. In FIG. 10, the time lag between samples of the second delay time is represented as "$\Delta43W-\Delta43(j-1)$".

The second shift value calculating unit 218 accumulates the time lag between samples of the second delay time calculated in the second inter-sample time lag calculating unit 216. Then, the second shift value calculating unit 218 calculates a second shift value obtained by shifting the accumulated value by a predetermined value. An example of the second shift value according to an embodiment of the present disclosure will be described later. In addition, the second shift value calculating unit 218 is configured to include, for example, a circuit having any configuration capable of performing an accumulation operation and a shift operation. Additionally, the second shift value calculating unit 218 is configured to include, for example, a circuit having any configuration capable of performing an accumulation operation. In FIG. 10, the second shift value is represented as "Shift[$\Sigma_{43}$(j)]".

The second difference value calculating unit 220 is configured to include, for example, an adder, and outputs a second difference value that is the difference value between the second delay time calculated in the return-path delay time calculating unit 118 and the second shift value.

The calculation unit 222 calculates time difference (an offset) based on the first difference value and the second difference value.

The calculation unit 222 is configured to include, for example, an adder 232 and a multiplier 234. Here, when the calculation unit 222 illustrated in FIG. 10 is compared with the calculation unit 154 illustrated in FIG. 5, it is found that the calculation unit 222 is similar in structure to the calculation unit 154. In other words, the calculation unit 222 calculates a time lag by performing an operation similar to that of the calculation unit 154 illustrated in FIG. 5 using the first difference value and the second difference value. More specifically, the calculation unit 222 calculates time difference, for example, by performing an operation shown in Equation (21) which will be described later.

Note that, the configuration of the calculation unit 222 is not limited to the above-described configuration. For example, the calculation unit 222 may be configured to include a divider that divides the calculated difference value by 2 instead of the multiplier 234.

The process in the offset calculating unit 202 will be described in more detail below.

From the above Assumptions 2 and 3, Equations (6) and (7) are satisfied.

The offset calculating unit 202 includes the first inter-sample time lag calculating unit 210 and the second inter-sample time lag calculating unit 216, and thus jitter_ms(j) represented in Equation (11) below and jitter_sm(j) represented in Equation (12) below are introduced to the offset calculating unit 202.

$$\text{jitter\_}ms(j)=\Delta 21(j)-\Delta 21(j-1)=\text{delay\_}ms(j)-\text{delay\_}ms(j-1) \quad (11)$$

$$\text{jitter\_}sm(j)=\Delta 43(j)-\Delta 43(j-1)=\text{delay\_}sm(j)-\text{delay\_}sm(j-1) \quad (12)$$

The offset calculating unit 202 includes the first shift value calculating unit 212 and the second shift value calculating unit 218, and thus the cumulative sum of jitter_ms(j) represented in Equation (13) below and the cumulative sum of jitter_sm(j) represented in Equation (14) below are introduced into the offset calculating unit 202. Additionally, in Equations (13) and (14), the cumulative sum E is defined in the range of n from 2 to j.

$$\Sigma\text{jitter\_}ms(j)=\{\text{delay\_}ms(2)-\text{delay\_}ms(1)\}+\{\text{delay\_}ms(3)-\text{delay\_}ms(2)\}+\{\text{delay\_}ms(4)-\text{delay\_}ms(3)\}+\ldots+\{\text{delay\_}ms(j)-\text{delay\_}ms(j-1)\}=\text{delay\_}ms(j)-\text{delay\_}ms(1) \quad (13)$$

$$\Sigma\text{jitter\_}sm(j)=\{\text{delay\_}sm(2)-\text{delay\_}sm(1)\}+\{\text{delay\_}sm(3)-\text{delay\_}sm(2)\}+\{\text{delay\_}sm(4)-\text{delay\_}sm(3)\}+\ldots+\{\text{delay\_}sm(j)-\text{delay\_}sm(j-1)\}=\text{delay\_}sm(j)-\text{delay\_}sm(1) \quad (14)$$

As shown in Equation (13), $\Sigma$jitter_ms(j) is delay_ms(j) obtained by shifting it by an initial value of a cumulative sum process. In addition, as shown in Equation (14), $\Sigma$jitter_sm(j) is delay_sm(j) obtained by shifting it by an initial value of a cumulative sum process.

Furthermore, the offset calculating unit 202 includes the first shift value calculating unit 212 and the second shift value calculating unit 218, and thus shift[$\Sigma$jitter_ms(j)] obtained by being subjected to a shift operation while holding "min{$\Sigma$jitter_ms(j)}=0" and shift[$\Sigma$jitter_sm(j)] obtained by being subjected to a shift operation while holding "min{$\Sigma$jitter_sm(j)}=0" are introduced into the offset calculating unit 202.

Here, shift[$\Sigma$jitter_ms(j)] corresponds to variable_delay_ms(j) shown in Equation (6), and shift[$\Sigma$jitter_sm(j)] corresponds to variable_delay_sm(j) shown in Equation (7). Thus, the relationship shown in Equation (15) below is satisfied between shift[$\Sigma$jitter_ms(j)] and variable_delay_ms(j). In addition, the relationship shown in Equation (16) below is satisfied between shift[$\Sigma$jitter_sm(j)] and variable_delay_sm(j).

$$\text{shift}[\Sigma\text{jitter\_}ms(j)]=\text{variable\_delay\_}ms(j) \quad (15)$$

$$\text{shift}[\Sigma\text{jitter\_}sm(j)]=\text{variable\_delay\_}sm(j) \quad (16)$$

Equations (17) and (18) below are obtained from Equations (4) and (5) based on Assumption 1, Equations (6) and (7) based on Assumptions 2 and 3, and Equations (15) and (16). Here, "$\Delta 21(j)$" shown in Equation (17) corresponds to the first difference value, and "$\Delta 43(j)$" shown in Equation (18) corresponds to the second difference value. In other words, the first difference value calculating unit 214 calculates the first difference value by performing an operation shown in Equation (17), and the second difference value calculating unit 220 calculates the second difference value by performing an operation shown in Equation (18).

$$\Delta 21(j)=\text{fixed\_delay}+\text{offset}+\text{shift}[\Sigma\text{jitter\_}ms(j)] \quad (17)$$

$$\Delta 43(j)=\text{fixed\_delay}-\text{offset}+\text{shift}[\Sigma\text{jitter\_}sm(j)] \quad (18)$$

Equation (19) below is obtained from Equation (17), and Equation (20) below is obtained from Equation (18). In addition, Equation (21) below is obtained from Equations (19) and (20) below. The calculation unit 222 calculates time difference (an offset) by performing an operation shown in Equation (21).

$$\text{offset}=\Delta 21(j)-\text{shift}[\Sigma\text{jitter\_}ms(j)]-\text{fixed\_delay} \quad (19)$$

$$\text{offset}=-\Delta 43(j)+\text{shift}[\Sigma\text{jitter\_}sm(j)]+\text{fixed\_delay} \quad (20)$$

$$\text{offset}=[\{\Delta 21(j)-\text{shift}[\Sigma\text{jitter\_}ms(j)]\}-\{\Delta 43(j)-\text{shift}[\Sigma\text{jitter\_}sm(j)]\}]\times(\tfrac{1}{2}) \quad (21)$$

Figure 11:
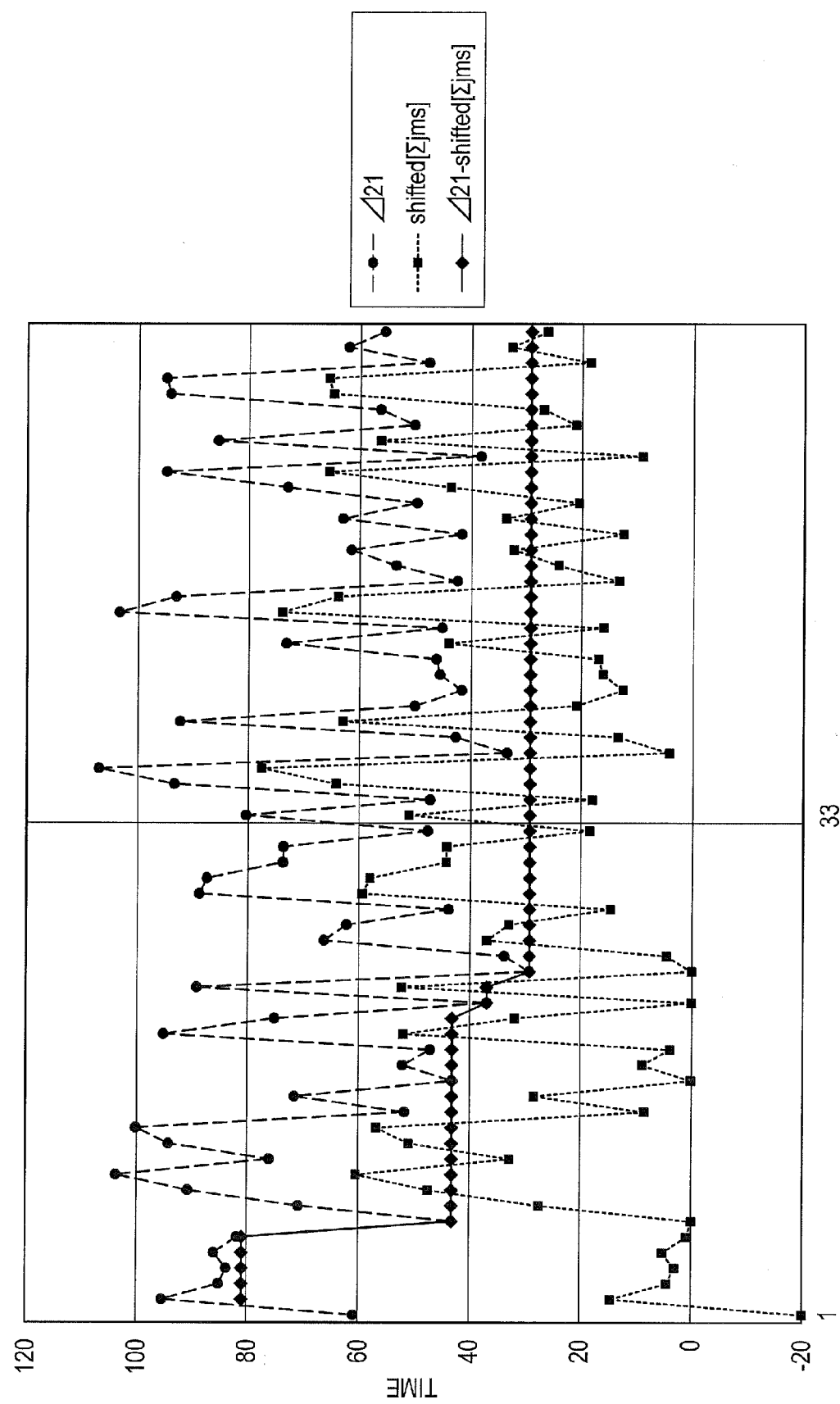
FIG. 11 is a block diagram illustrating an exemplary configuration of an offset calculating unit included in the receiver according to the second embodiment.
Figure 12:
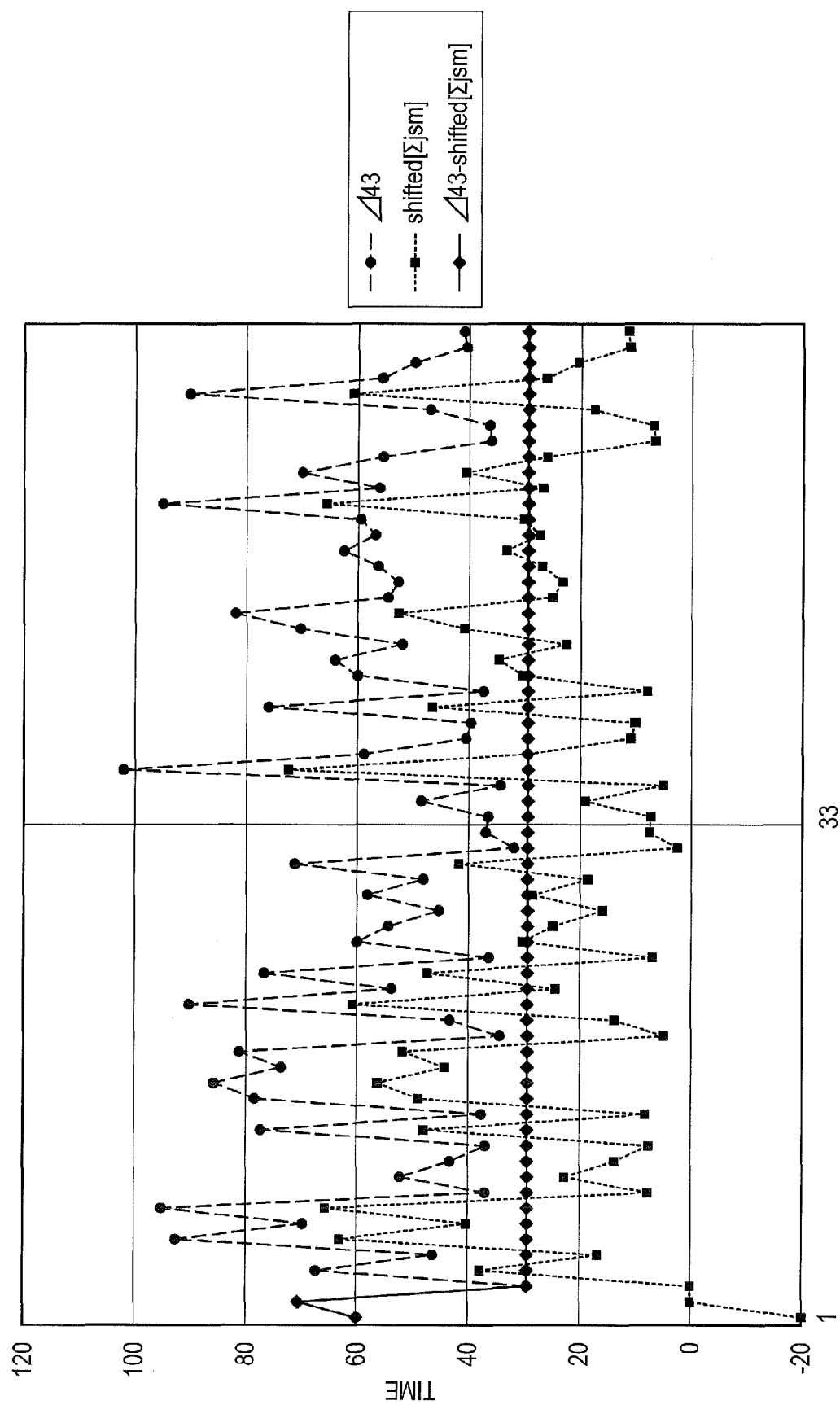
FIG. 12 is a block diagram illustrating an exemplary configuration of an offset calculating unit included in the receiver according to the second embodiment.
Figure 13:
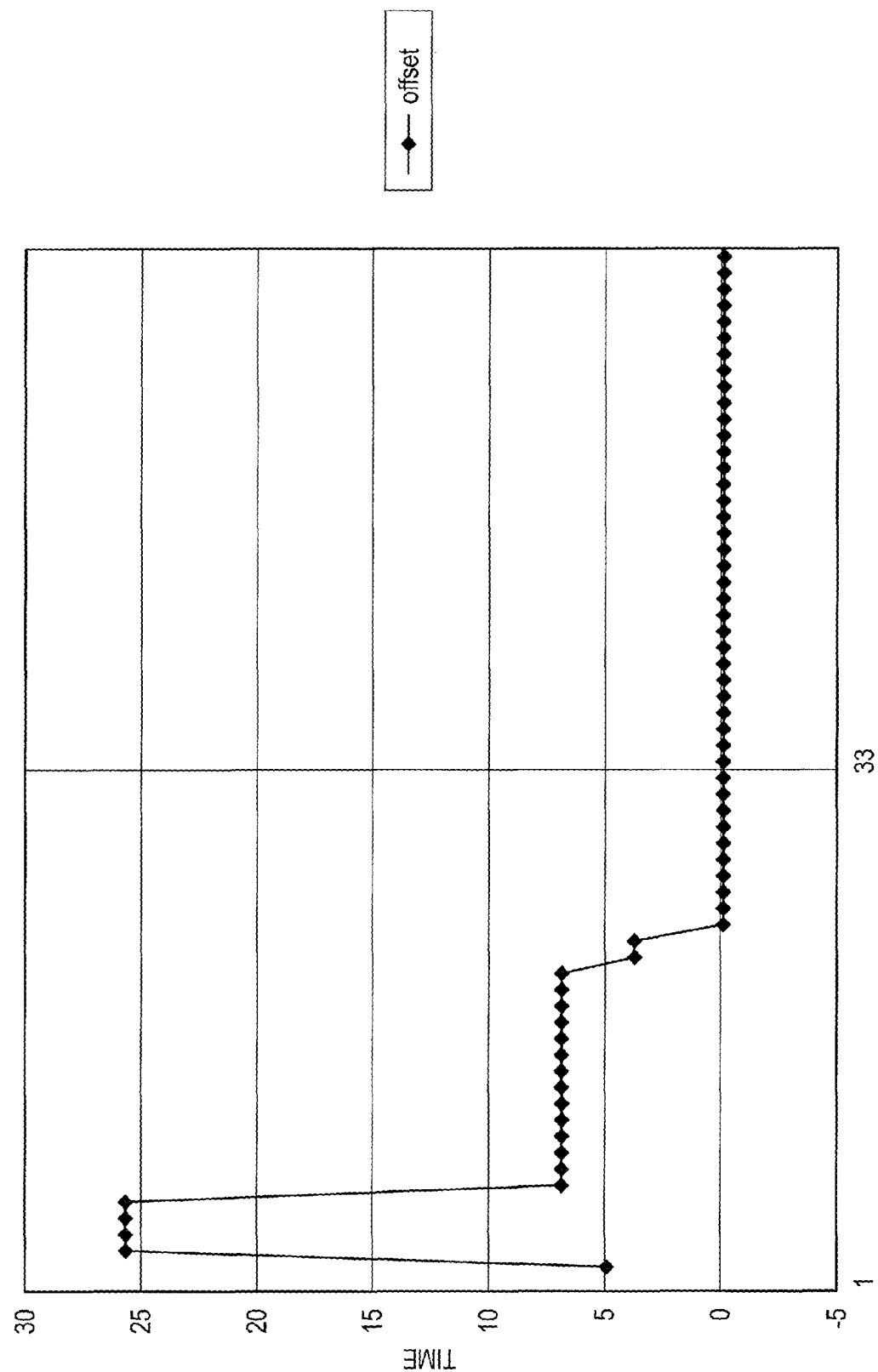
FIG. 13 is a block diagram illustrating an exemplary configuration of an offset calculating unit included in the receiver according to the second embodiment.

FIGS. 11 to 13 are diagrams for explaining an example of the procedure of a process in the offset calculating unit 202 included in the receiver 200 according to the second embodiment. FIGS. 11 to 13 are graphs using sample data in which time difference (an offset) equals to zero, and the vertical axis represents the delay time and the horizontal axis represents the sample number. FIG. 11 shows states of $\Delta 21(j)$, shift[$\Sigma$jitter_ms(j)], and $\Delta 21(j)$−shift[$\Sigma$jitter_ms(j)]. FIG. 12 shows states of $\Delta 43(j)$, shift[$\Sigma$jitter_sm(j)], and $\Delta 43(j)$−shift[$\Sigma$jitter_sm(j)]. In addition, FIG. 13 shows states of Offset (that is, a time lag) calculated by Equation (21).

For example, as illustrated in FIG. 13, the time lag (an offset) calculated in the offset calculating unit 202 is found to converge to zero.

Figure 14:
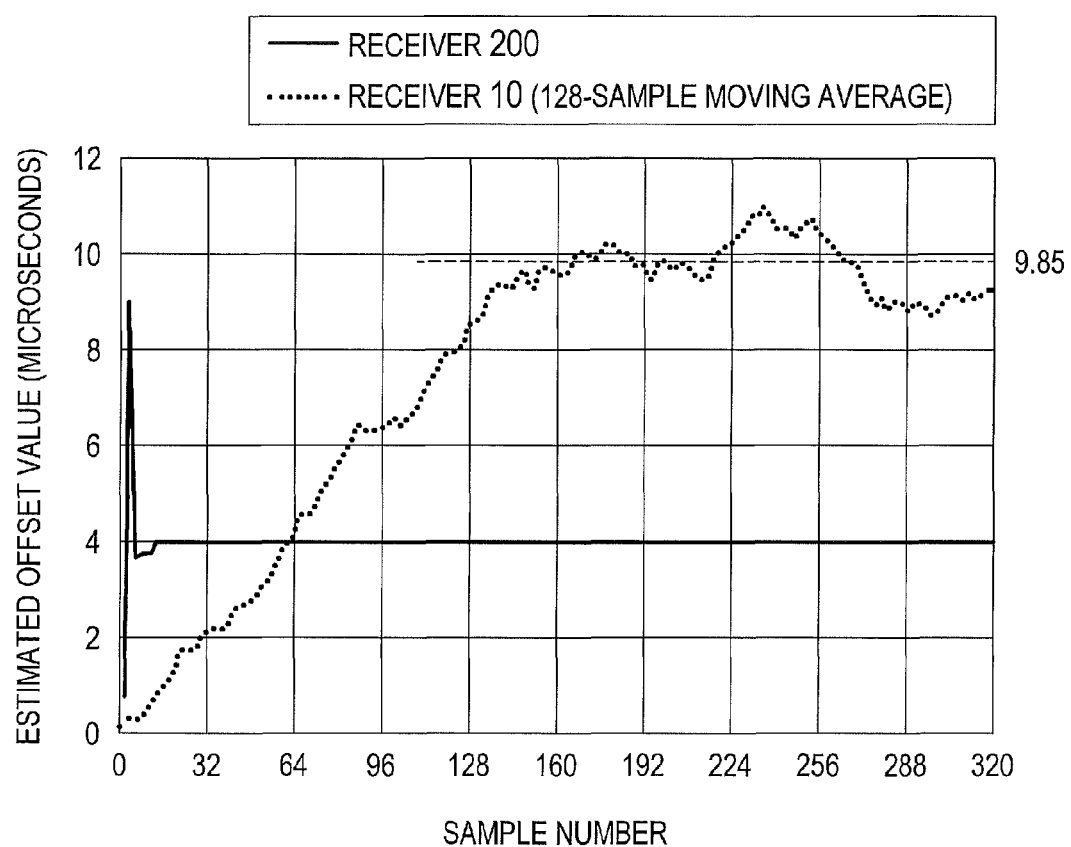
FIG. 14 is a graph for explaining an example of a simulation result obtained from the process in the offset calculating unit included in the receiver according to the second embodiment and the process in the offset calculating unit and a noise reduction filter unit included in the receiver shown in FIG. 2.
Figure 15:
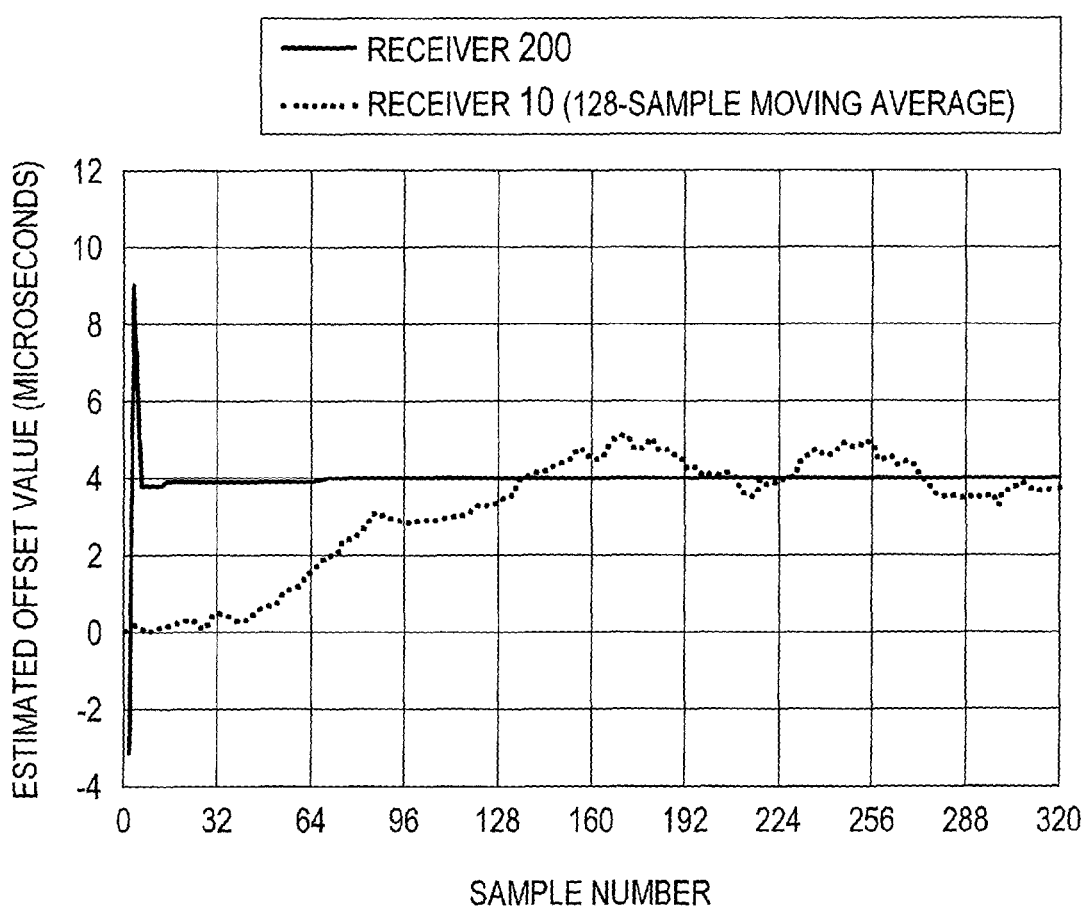
FIG. 15 is a graph for explaining an example of a simulation result obtained from the process in the offset calculating unit included in the receiver according to the second embodiment and the process in the offset calculating unit and a noise reduction filter unit included in the receiver shown in FIG. 2.

FIGS. 14 and 15 are diagrams for explaining an example of a simulation result of the process in the offset calculating unit 202 included in the receiver 200 according to the second embodiment and the process in the offset calculating unit 30 and the noise reduction filter unit 32 included in the receiver 10 illustrated in FIG. 2.

In FIG. 14, there is illustrated a simulation result when the receiver 10 includes a 128-sample moving average filter (a low-pass filter) as the noise reduction filter unit 32. In addition, FIG. 14 illustrates a simulation result in a case of using data obtained by adjusting actual measurement data in which a fixed component of delay (that is, a minimum delay) in a forward-path direction (the direction from a transmitter to a receiver) is equal to that in a return-path direction (the direction from a receiver to a transmitter) and their average values of delay are different from each other by 11.7 microseconds so that the offset value is equal to 4 microseconds.

When the receiver 10 is used, a valid calculation is performed after 128 samples because of using a 128-sample moving average filter. Thus, as shown in FIG. 14, when the receiver 10 is used, a control delay occurs. FIG. 14 shows the difference between the convergence states of offset values in the receiver 200 and the receiver 10 by plotting results calculated by setting missing data to zero even in the section of samples 1 to 127.

Furthermore, when the receiver 10 is used, as shown in FIG. 14, it is found that the offset value outputted from the 128-sample moving average filter in the receiver 10 contains an error of one-half (that is, 5.85 microseconds) of the average value of delay, as compared with that of the offset value outputted from the offset calculating unit 202 included in the receiver 200.

In FIG. 15, as with FIG. 14, there is illustrated a simulation result when the receiver 10 includes a 128-sample moving average filter (a low-pass filter) as the noise reduction filter unit 32. In addition, FIG. 15 illustrates a simulation result in a case of using data obtained by adjusting actual measurement data in which a fixed component of delay (that is, a minimum delay) in a forward-path direction (the direction from a transmitter to a receiver) is equal to that in a return-path direction (the direction from a receiver to a transmitter) so that their average values of delay are equal to each other and the offset value is equal to 4 microseconds.

If their average values of delay are equal to each other, even when the receiver 10 is used, such error as observed in FIG. 14 is not included. However, as shown in FIG. 15, it is found that the offset value outputted from the 128-sample moving average filter in the receiver 10 contains a variable component of delay which is not suppressed, as compared with that of the offset value outputted from the offset calculating unit 202 included in the receiver 200. As with FIG. 14, FIG. 15 shows the difference between the convergence states of offset values in the receiver 200 and the receiver 10 by plotting results calculated by setting missing data to zero even in the section of samples 1 to 127.

[2-2] Configuration for Correction Process

The correction unit 206 corrects the time of a clock in the receiver 200 based on the time difference calculated in the offset calculating unit 202.

The correction unit 206 is configured to include, for example, the count value rewriting unit 204 and the counter 126. Here, the count value rewriting unit 204 rewrites a count value in the counter 126 based on the time difference calculated in the offset calculating unit 202. In addition, the counter 126 has the function and structure, for example, similar to those of the counter 38 illustrated in FIG. 2.

The correction unit 206 rewrites a count value of the counter 126 based on the time difference calculated in the offset calculating unit 202. In other words, the correction unit 206 directly changes a count value of the counter 126 based on the time difference calculated in the offset calculating unit 202.

Here, for example, as illustrated with reference to FIG. 2, a value of the counter (a count value) included in the receiver 100 is used to generate time information. Thus, the direct change in count values of the counter 126 makes it possible for the correction unit 206 to correct the time of a clock in the receiver 200.

The receiver 200 according to the second embodiment performs the process for the method of calculating time difference according to an embodiment of the present disclosure (for example, the processes of (1) (the process of calculating the first delay time) to (3) (the process of calculating time difference) and the correction process), for example, using the configuration illustrated in FIG. 9.

Thus, the receiver 200 according to the second embodiment can calculate time difference between the time of a clock in a transmitter and the time of a clock in the receiver, for example, using the configuration illustrated in FIG. 9.

Furthermore, the receiver 200 according to the second embodiment is not necessary to use a filter upon the calculation of time difference or to know a minimum value of the delay time or the like in advance. Thus, the receiver 200 according to the second embodiment can prevent the control delay due to the process using a filter or the occurrence of offset errors, for example, using the configuration illustrated in FIG. 9, and, in addition, the receiver 200 can calculate time difference between the time of a clock in a transmitter and the time of a clock in the receiver more accurately.

Note that, the configuration of the receiver according to the second embodiment is not limited to the configuration illustrated in FIG. 9.

For example, the receiver according to the second embodiment may be a time difference calculating device which is configured to include structural elements for performing the process for the method of calculating time difference according to an embodiment of the present disclosure (for example, "the processes of (1) (the process of calculating the first delay time) to (3) (the process of calculating time difference)" or "the processes of (1) (the process of calculating the first delay time) to (3) (the process of calculating time difference) and the correction process"). When the receiver according to the second embodiment is the time difference calculating device, for example, the receiver according to the second embodiment is incorporated into a receiver communicating with a transmitter, and thus the configuration illustrated in FIG. 9 can be obtained.

Receiver According to Another Embodiment

Note that, the configuration of the receiver according to an embodiment of the present disclosure is not limited to the receiver 100 according to the first embodiment illustrated in FIG. 4 (including the configuration according to modifications) or the receiver 200 according to the second embodiment illustrated in FIG. 9 (including the configuration according to modifications).

[3-1] Receiver According to Third Embodiment

For example, the receiver according to an embodiment of the present disclosure having the configuration shown in FIG. 4 may be configured to include the correction unit 206 shown in FIG. 9 instead of the correction unit 128.

Even in the configuration described above, a receiver according to a third embodiment can perform the processes of (1) (the process of calculating the first delay time) to (3) (the process of calculating time difference)) for the method of calculating time difference according to an embodiment of the present disclosure in a similar way to the receiver 100 according to the first embodiment shown in FIG. 4. Thus, the receiver according to the third embodiment can achieve the same effect as the receiver 100 according to the first embodiment shown in FIG. 4.

Even in the configuration described above, the receiver according to the third embodiment can perform the correction process for the method of calculating time difference according to an embodiment of the present disclosure in a similar way to the receiver 200 according to the second embodiment shown in FIG. 9. Thus, the receiver according to the third embodiment can correct the time of a clock in the receiver by directly changing a count value of the counter 126 in a similar way to the receiver 200 according to the second embodiment shown in FIG. 9.

Moreover, the receiver according to the third embodiment can provide a modification, similar to the receiver according to the first embodiment described above.

[3-2] Receiver According to Fourth Embodiment

Furthermore, the receiver according to an embodiment of the present disclosure having the configuration shown in FIG. 9 may be configured to include the correction unit 128 shown in FIG. 4 instead of the correction unit 206.

Even in the configuration described above, a receiver according to a fourth embodiment can perform the processes of (1) (the process of calculating the first delay time) to (3) (the process of calculating time difference) for the method of calculating time difference according to an embodiment of the present disclosure in a similar way to the receiver 200 according to the second embodiment shown in FIG. 9. Thus, the receiver according to the fourth embodiment can achieve the same effect as the receiver 200 according to the second embodiment shown in FIG. 9.

Further, even in the configuration described above, the receiver according to the fourth embodiment can perform the correction process for the method of calculating time difference according to an embodiment of the present disclosure in a similar way to the receiver 100 according to the first embodiment shown in FIG. 4. Thus, the receiver according to the fourth embodiment can correct the time of a clock in the receiver by indirectly changing a count value of the counter 126 in a similar way to the receiver 100 according to the first embodiment shown in FIG. 4.

Moreover, the receiver according to the fourth embodiment can provide a modification, similar to the receiver according to the second embodiment described above.

As described above, the receiver according to an embodiment of the present disclosure is not necessary to perform the noise reduction process of "time difference (offset) between the time of a clock in a transmitter and the time of a clock in the receiver", and thus it is possible to prevent the control delay due to the process of using a filter. In addition, the receiver according to an embodiment of the present disclosure is not necessary to perform the noise reduction process, and thus it is possible to prevent occurrence of errors of the calculated time lag (offset), for example, under the condition that the minimum value of the forward-path delay time (a delay time from a transmitter to a receiver) is equal to that of the return-path delay time (a delay time from a receiver to a transmitter). Additionally, the receiver according to an embodiment of the present disclosure is not necessary to know a minimum value of the delay time or the like in advance upon the calculation of "time difference (offset) between the time of a clock in a transmitter and the time of a clock in the receiver".

Thus, the receiver according to an embodiment of the present disclosure can achieve high performance of the time correction function without it being necessary to know a minimum value of the delay time or the like in advance.

Although an embodiment of the present disclosure has been described by exemplifying a receiver, the embodiment of the present disclosure is not limited thereto. For example, the embodiment of the present disclosure can be implemented in various types of electronic devices including a computer such as personal computers (PCs) or servers, a video/music playback device (or a video/music recording and playback device), and game consoles. In addition, the embodiment of the present disclosure can be implemented in, for example, a processing integrated circuit (IC) capable of being incorporated into the electronic devices described above.

Furthermore, although the embodiment of the present disclosure has been described by exemplifying a transmitter as a target to be communicated with the receiver, the embodiment of the present disclosure is not limited thereto. For example, the present embodiment can be implemented in various types of electronic devices including a computer such as PCs or servers, a video/music playback device (or a video/music recording and playback device), and a game console.

(Program According to an Embodiment of the Present Disclosure)

It is possible to calculate time difference between the time of a clock in a transmitter and the time of a clock in a receiver by causing a computer to execute a program (for example, a program capable of allowing a computer to execute the process for the method of calculating time difference according to the present embodiment, such as "the processes of (1) (the process of calculating the first delay time) to (3) (the process of calculating time difference)" or "the processes of (1) (the process of calculating the first delay time) to (3) (the process of calculating time difference) and the correction process) used to allow the computer to function as the receiver according to an embodiment of the present disclosure.

Moreover, the program used to cause a computer to function as the receiver according to an embodiment of the present disclosure is executed in the computer, and thus it can have the same effect as the receivers according to the first to fourth embodiments described above.

It should be understood by those skilled in the art that various modifications, combinations, sub-combinations and alterations may occur depending on design requirements and other factors insofar as they are within the scope of the appended claims or the equivalents thereof.

For example, in the above, although there has been provided a program (a computer program) that causes a computer to function as the receiver according to an embodiment of the present disclosure, according to an embodiment of the present disclosure, it is also possible to provide a recording medium with the program stored thereon.

The configuration described above is merely an example of an embodiment of the present disclosure and thus falls within the technical scope of the disclosure.

Additionally, the present application may also be configured as below.

(1) A receiver including:

a first delay time calculating unit configured to calculate a first delay time indicating a time lag between transmission of a transmission signal by a transmitter and reception of the transmission signal by the receiver based on first time information indicating a time at which the transmitter transmits the transmission signal and second time information indicating a time at which the receiver receives the transmission signal;

a second delay time calculating unit configured to calculate a second delay time indicating a time lag between transmission of a response signal by the receiver and reception of the response signal by the transmitter based on third time information indicating a time at which the receiver transmits the response signal corresponding to the transmission signal and fourth time information indicating a time at which the transmitter receives the response signal; and a time difference calculating unit configured to calculate a time difference between a time of a clock in the transmitter and a time of a clock in the receiver based on the calculated first delay time and the calculated second delay time, wherein the time difference calculating unit calculates a fixed delay component in the first delay time and the second delay time as the time lag using a logical operation without using a filter.

(2) The receiver according to (1), wherein the time difference calculating unit includes a first minimum value holding unit configured to hold a minimum value of the calculated first delay time and to output the held minimum value of the first delay time, a second minimum value holding unit configured to hold a minimum value of the calculated second delay time and to output the held minimum value of the second delay time, and a calculation unit configured to calculate the time difference based on the minimum value of the first delay time and the minimum value of the second delay time.

(3) The receiver according to (1), wherein the time difference calculating unit includes a first inter-sample time lag calculating unit configured to calculate a time lag between temporally consecutive samples of the calculated first delay time, a first shift value calculating unit configured to accumulate the time lag between samples of the first delay time and to calculate a first shift value obtained by shifting the accumulated value by a predetermined value, a first difference value calculating unit configured to calculate a first difference value that is a difference value between the calculated first delay time and the calculated first shift value, a second inter-sample time lag calculating unit configured to calculate a time lag between temporally consecutive samples of the calculated second delay time, a second shift value calculating unit configured to accumulate the time lag between samples of the second delay time and to calculate a second shift value obtained by shifting the accumulated value by a predetermined value, a second difference value calculating unit configured to calculate a second difference value that is a difference value between the calculated second delay time and the calculated second shift value, and a calculation unit configured to calculate the time difference based on the first difference value and the second difference value.

(4) The receiver according to any one of (1) to (3), further including:

a correction unit configured to correct the time of the clock in the receiver based on the calculated time difference.

(5) The receiver according to (4), wherein the correction unit corrects the time of the clock in the receiver by adjusting a clock signal used to control a count value of a counter based on the calculated time difference.

(6) The receiver according to (4), wherein the correction unit corrects the time of the clock in the receiver by rewriting a count value based on the calculated time difference.

(7) A method of calculating time difference, the method including:

calculating a first delay time indicating a time lag between transmission of a transmission signal by a transmitter and reception of the transmission signal by a receiver based on first time information indicating a time at which the transmitter transmits the transmission signal and second time information indicating a time at which the receiver receives the transmission signal;

calculating a second delay time indicating a time lag between transmission of a response signal by the receiver and reception of the response signal by the transmitter based on third time information indicating a time at which the receiver transmits the response signal corresponding to the transmission signal and fourth time information indicating a time at which the transmitter receives the response signal; and calculating a time difference between a time of a clock in the transmitter and a time of a clock in the receiver based on the calculated first delay time and the calculated second delay time, wherein, in the step of calculating the time difference, a fixed delay component in the first delay time and the second delay time is calculated as the time lag using a logical operation without using a filter.

(8) A program for causing a computer to execute:

calculating a first delay time indicating a time lag between transmission of a transmission signal by a transmitter and reception of the transmission signal by a receiver based on first time information indicating a time at which the transmitter transmits the transmission signal and second time information indicating a time at which the receiver receives the transmission signal;

calculating a second delay time indicating a time lag between transmission of a response signal by the receiver and reception of the response signal by the transmitter based on third time information indicating a time at which the receiver transmits the response signal corresponding to the transmission signal and fourth time information indicating a time at which the transmitter receives the response signal; and calculating a time difference between a time of a clock in the transmitter and a time of a clock in the receiver based on the calculated first delay time and the calculated second delay time, wherein, in the step of calculating the time difference, a fixed delay component in the first delay time and the second delay time is calculated as the time lag using a logical operation without using a filter.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A receiver comprising:
a first delay time calculating unit configured to calculate a first delay time indicating a time lag between transmission of a transmission signal by a transmitter and reception of the transmission signal by the receiver based on first time information indicating a time at which the transmitter transmits the transmission signal and second time information indicating a time at which the receiver receives the transmission signal;
a second delay time calculating unit configured to calculate a second delay time indicating a time lag between transmission of a response signal by the receiver and reception of the response signal by the transmitter based on third time information indicating a time at which the receiver transmits the response signal corresponding to the transmission signal and fourth time information indicating a time at which the transmitter receives the response signal; and a time difference calculating unit configured to calculate a time difference between a time of a clock in the transmitter and a time of a clock in the receiver based on the calculated first delay time and the calculated second delay time, wherein the time difference calculating unit calculates a fixed delay component in the first delay time and the second delay time as the time lag using a logical operation without using a filter; and wherein the time difference calculating unit includes:

a first inter-sample time lag calculating unit configured to calculate a time lag between temporally consecutive samples of the calculated first delay time, a first shift value calculating unit configured to accumulate the time lag between samples of the first delay time and to calculate a first shift value obtained by shifting the accumulated value by a predetermined value, a first difference value calculating unit configured to calculate a first difference value that is a difference value between the calculated first delay time and the calculated first shift value, a second inter-sample time lag calculating unit configured to calculate a time lag between temporally consecutive samples of the calculated second delay time, a second shift value calculating unit configured to accumulate the time lag between samples of the second delay time and to calculate a second shift value obtained by shifting the accumulated value by a predetermined value, a second difference value calculating unit configured to calculate a second difference value that is a difference value between the calculated second delay time and the calculated second shift value, and a calculation unit configured to calculate the time difference based on the first difference value and the second difference value.

2. The receiver according to claim 1, further comprising:
a correction unit configured to correct the time of the clock in the receiver based on the calculated time difference.

3. The receiver according to claim 2, wherein the correction unit corrects the time of the clock in the receiver by adjusting a clock signal used to control a count value of a counter based on the calculated time difference.

4. The receiver according to claim 2, wherein the correction unit corrects the time of the clock in the receiver by rewriting a count value based on the calculated time difference.

5. A method of calculating time difference, the method comprising:

calculating a first delay time indicating a time lag between transmission of a transmission signal by a transmitter and reception of the transmission signal by a receiver based on first time information indicating a time at which the transmitter transmits the transmission signal and second time information indicating a time at which the receiver receives the transmission signal;

calculating a second delay time indicating a time lag between transmission of a response signal by the receiver and reception of the response signal by the transmitter based on third time information indicating a time at which the receiver transmits the response signal corresponding to the transmission signal and fourth time information indicating a time at which the transmitter receives the response signal; and calculating a time difference between a time of a clock in the transmitter and a time of a clock in the receiver based on the calculated first delay time and the calculated second delay time, wherein, in the step of calculating the time difference, a fixed delay component in the first delay time and the second delay time is calculated as the time lag using a logical operation without using a filter;

calculating a time lag between temporally consecutive samples of the calculated first delay time;

accumulating the time lag between samples of the first delay time and calculating a first shift value obtained by shifting the accumulated value by a predetermined value;

calculating a first difference value that is a difference value between the calculated first delay time and the calculated first shift value;

calculating a time lag between temporally consecutive samples of the calculated second delay time;

accumulating the time lag between samples of the second delay time and calculating a second shift value obtained by shifting the accumulated value by a predetermined value;

calculating a second difference value that is a difference value between the calculated second delay time and the calculated second shift value; and calculating the time difference based on the first difference value and the second difference value wherein each of the step is implemented by using hardware.

6. A computer-program product for calculating a time difference, the computer-program product comprising a non-transitory computer readable medium having instructions thereon, the instructions comprising:

calculating a first delay time indicating a time lag between transmission of a transmission signal by a transmitter and reception of the transmission signal by a receiver based on first time information indicating a time at which the transmitter transmits the transmission signal and second time information indicating a time at which the receiver receives the transmission signal;

calculating a second delay time indicating a time lag between transmission of a response signal by the receiver and reception of the response signal by the transmitter based on third time information indicating a time at which the receiver transmits the response signal corresponding to the transmission signal and fourth time information indicating a time at which the transmitter receives the response signal; and calculating a time difference between a time of a clock in the transmitter and a time of a clock in the receiver based on the calculated first delay time and the calculated second delay time, wherein, in the step of calculating the time difference, a fixed delay component in the first delay time and the second delay time is calculated as the time lag using a logical operation without using a filter;

calculating a time lag between temporally consecutive samples of the calculated first delay time;

accumulating the time lag between samples of the first delay time and calculating a first shift value obtained by shifting the accumulated value by a predetermined value;

calculating a first difference value that is a difference value between the calculated first delay time and the calculated first shift value;

calculating a time lag between temporally consecutive samples of the calculated second delay time;

accumulating the time lag between samples of the second delay time and calculating a second shift value obtained by shifting the accumulated value by a predetermined value;

calculating a second difference value that is a difference value between the calculated second delay time and the calculated second shift value; and calculating the time difference based on the first difference value and the second difference value.

\* \* \* \* \*